(12) United States Patent
Uno et al.

(10) Patent No.: US 9,140,875 B2
(45) Date of Patent: Sep. 22, 2015

(54) LENS DRIVE DEVICE

(71) Applicant: TDK CORPORATION, Tokyo (JP)

(72) Inventors: Masaru Uno, Tokyo (JP); Kazutomo Imi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 42 days.

(21) Appl. No.: 14/043,311

(22) Filed: Oct. 1, 2013

(65) Prior Publication Data

US 2014/0111877 A1    Apr. 24, 2014

(30) Foreign Application Priority Data

Oct. 19, 2012    (JP) .................................. 2012-231976

(51) Int. Cl.
| | |
|---|---|
| G02B 7/02 | (2006.01) |
| G02B 7/08 | (2006.01) |
| H02N 2/00 | (2006.01) |
| H02N 2/02 | (2006.01) |

(52) U.S. Cl.
CPC ........ *G02B 7/023* (2013.01); *G02B 7/08* (2013.01); *H02N 2/004* (2013.01); *H02N 2/026* (2013.01)

(58) Field of Classification Search
CPC .............. G03B 5/00; G03B 3/10; G02B 7/00; G02B 7/022; G02B 7/023; G02B 7/1822; G02B 7/026; G02B 13/001; G02B 13/009

USPC .................. 359/824, 811–814, 818, 819, 822
See application file for complete search history.

(56) References Cited

U.S. PATENT DOCUMENTS

| | | | |
|---|---|---|---|
| 7,706,089 B2 | 4/2010 | Koc et al. | |
| 2012/0154937 A1* | 6/2012 | Kang et al. | 359/824 |
| 2012/0236423 A1* | 9/2012 | Uno et al. | 359/814 |

FOREIGN PATENT DOCUMENTS

| | | | |
|---|---|---|---|
| JP | A-07-201054 | | 8/1995 |
| JP | 2008152265 A | * | 7/2008 |
| JP | A-2008-152265 | | 7/2008 |
| WO | WO 2011/132920 A2 | | 10/2011 |
| WO | WO 2011132920 A2 | * | 10/2011 |

* cited by examiner

*Primary Examiner* — Darryl J Collins
*Assistant Examiner* — Journey Sumlar
(74) *Attorney, Agent, or Firm* — Oliff PLC

(57) ABSTRACT

A lens drive device comprises a base, a lens holder, a piezoelectric actuator having a pair of frictional parts, and a pressing piece. The lens holder has a barrel, a projection projecting from the barrel, a support separated from the barrel, and a joint joining the projection and the support to each other. The pressing piece presses the piezoelectric actuator against the barrel so as to keep such a state that at least one of the pair of frictional parts is in contact with the barrel.

8 Claims, 23 Drawing Sheets

(a)

(b)

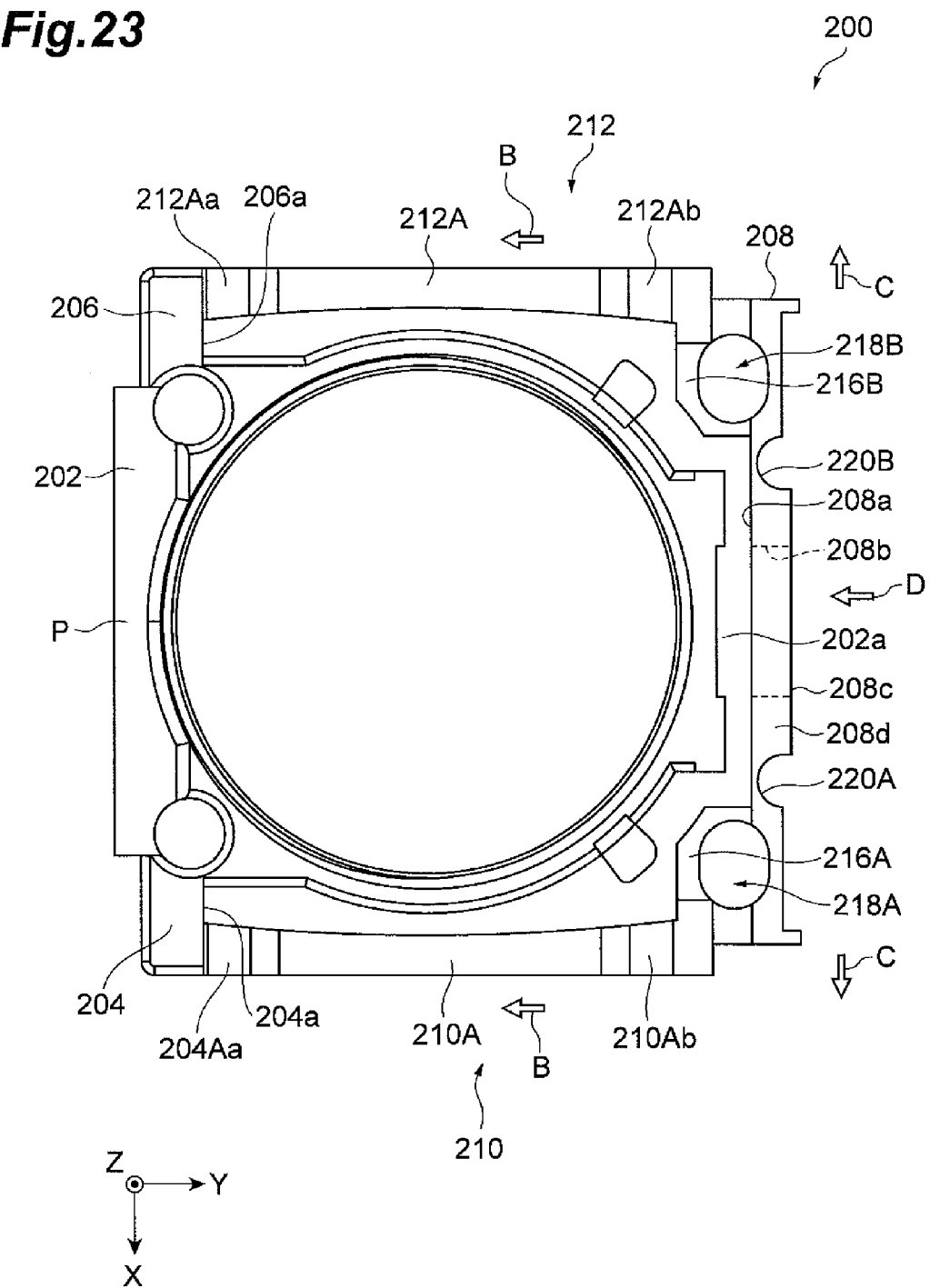

LENS DRIVE DEVICE

CROSS-REFERENCE TO RELATED APPLICATION

The disclosure of Japanese Patent Application No. JP 2012-231976 filed on Oct. 19, 2012 including the specification, drawings and abstract is incorporated herein by reference in its entirety.

BACKGROUND OF THE INVENTION

1. Field of the Invention

The present invention relates to a lens drive device for driving a lens for a camera.

2. Related Background Art

Patent Literature 1 (International Publication No. 2011/132920 pamphlet) discloses a lens drive device comprising a base, a lens holder, a magnet, an electromagnet, and a case. The lens holder has a cylindrical barrel for holding a lens, first and second projections projecting from the outer peripheral surface of the barrel in a direction intersecting the optical axis, a fixed part fixed on the base and arranged on the opposite side of the barrel from the first and second projections while being separated from the barrel, and first and second joints for joining the first and second projections to the fixed part, respectively.

Each of the first and second joints includes a pair of arm members each having a quadrangular prism form. The pair of arm members extend in parallel with each other between the projection and the fixed part. Each of the end parts of the pair of arm members is made thinner in the optical axis direction. Therefore, the pair of arm members are bendable with respect to the fixed part, while the projection and barrel are bendable with respect to the pair of arm members. The barrel unattached to the base can be translated so as to move closer to and away from the base through the arm members of the joints without substantially tilting the optical axis.

The magnet is attached to a side face of the barrel (the surface of the projection on the opposite side of the barrel). The electromagnet is attached to the base so as to oppose the magnet while being separated therefrom. The case is attached to the base so as to construct an accommodation space with the base, whereby the accommodation space contains therein the lens holder, magnet, and electromagnet.

In thus constructed lens drive device described in Patent Literature 1, the electromagnet operates so as to exert an electromagnetic force between the electromagnet and the magnet. This electromagnetic force translates the barrel so as to make it move closer to and away from the base according to the direction of a current while attracting the lens holder toward the electromagnet.

SUMMARY OF THE INVENTION

In the lens drive device described in Patent Literature 1, however, the electromagnet and the magnet (barrel), though attracted toward the electromagnet thereby, are separated from each other. Therefore, upon application of a large impact force such as that of a drop or vibration from the outside, the barrel may move in the optical axis direction against the electromagnetic force occurring between the electromagnet and the magnet. This may cause the barrel to collide with the base or case, thereby affecting operations of the device.

It is therefore an object of the present invention to provide a highly reliable lens drive device which is resistant to impact forces from the outside.

The lens drive device in accordance with one aspect of the present invention comprises a base, a lens holder arranged on the base, a piezoelectric actuator imparting a drive force to the lens holder, and pressing means for providing the piezoelectric actuator with a force to press the piezoelectric actuator against the lens holder; wherein the lens holder has a barrel holding a lens, a projection projecting from an outer peripheral surface of the barrel in a direction intersecting an optical axis direction of the lens, a support supporting the barrel on the base, the support is located on the opposite side of the barrel from the projection while being separated from the barrel and disposed upright on the base, and a joint joining the projection and the support to each other; wherein one end side of the joint is bendable with respect to the projection so as to allow the barrel to move in the optical axis direction through the projection; wherein the other end side of the joint is bendable with respect to the support so as to allow the joint to move in the optical axis direction; wherein the piezoelectric actuator is arranged at a position opposing a region on the opposite side of the outer peripheral surface of the barrel from the projection and has a plurality of frictional parts separated from each other in the optical axis direction; and wherein the pressing means presses the piezoelectric actuator against the barrel so as to keep such a state that at least one of the plurality of frictional parts is in contact with the region.

In the lens drive device in accordance with this aspect of the present invention, the pressing means presses the piezoelectric actuator against the barrel so as to keep such a state that at least one of a plurality of frictional parts is in contact with a predetermined region in the outer peripheral surface of the barrel. Driving the piezoelectric actuator in this state translates the barrel in the optical axis direction while the barrel receives the pressing force from the pressing means through the piezoelectric actuator. That is, the barrel is elastically held between the base and the pressing means independently of the driving state of the piezoelectric actuator. Hence, even upon application of an impact force from the outside, a buffer action for absorbing the impact is exhibited. As a result, a highly reliable lens drive device which is resistant to impact forces from the outside can be obtained.

In the lens drive device in accordance with this aspect of the present invention, the pressing means keeps such a state that at least one of a plurality of frictional parts is in contact with a predetermined region in the outer peripheral surface of the barrel. Therefore, even when the barrel is translated in the optical axis direction, the optical axis hardly tilts during the translation. Hence, the lens holder can be driven accurately.

The joint may have a plurality of arm members, arranged in parallel with each other in the optical axis direction, extending between the projection and the support.

The lens drive device in accordance with another aspect of the present invention comprises a base, a lens holder arranged on the base, a piezoelectric actuator imparting a drive force to the lens holder, and pressing means for providing the piezoelectric actuator with a force to press the piezoelectric actuator against the lens holder; wherein the lens holder has a barrel holding a lens, first and second projections projecting from an outer peripheral surface of the barrel in directions opposite from each other intersecting an optical axis direction of the lens, a support supporting the barrel on the base, the support is located on the opposite side of the barrel from the first and second projections while being separated from the barrel and disposed upright on the base, a first joint joining the first projection and the support to each other, and a second joint joining the second projection and the support to each other; wherein the first and second joints extend in the same direction from the first and second projections, respectively, while interposing the barrel therebetween; wherein one end side of the first joint is bendable with respect to the first projection so as to allow the barrel to move in the optical axis direction through the first projection; wherein one end side of the second joint is bendable with respect to the second projection so as to allow the barrel to move in the optical axis direction through the second projection; wherein the other end sides of the first and second joints are bendable with respect to the support so as to allow the first and second joints to move in the optical axis direction; wherein the piezoelectric actuator is arranged at a position opposing a region on the opposite side of the outer peripheral surface of the barrel from the first and second projections and has a plurality of frictional parts separated from each other in the optical axis direction; and wherein the pressing means presses the piezoelectric actuator against the barrel so as to keep such a state that at least one of the plurality of frictional parts is in contact with the region.

In the lens drive device in accordance with this aspect of the present invention, the pressing means presses the piezoelectric actuator against the barrel so as to keep such a state that at least one of a plurality of frictional parts is in contact with a predetermined region in the outer peripheral surface of the barrel. Driving the piezoelectric actuator in this state translates the barrel in the optical axis direction while the barrel receives the pressing force from the pressing means through the piezoelectric actuator. That is, the barrel is elastically held between the base and the pressing means independently of the driving state of the piezoelectric actuator. Hence, even upon application of an impact force from the outside, a buffer action for absorbing the impact is exhibited. As a result, a highly reliable lens drive device which is resistant to impact forces from the outside can be obtained.

In the lens drive device in accordance with this aspect of the present invention, the pressing means keeps such a state that at least one of the plurality of frictional parts is in contact with a predetermined region in the outer peripheral surface of the barrel. Therefore, even when the barrel is translated in the optical axis direction, the optical axis hardly tilts during the translation. Hence, the lens holder can be driven accurately.

The first joint may have a plurality of first arm members, arranged in parallel with each other in the optical axis direction, extending between the first projection and the support, while the second joint may have a plurality of second arm members, arranged in parallel with each other in the optical axis direction, extending between the second projection and the support.

The pressing means may be a cantilever-type pressing piece located on the opposite side of the piezoelectric actuator from the barrel and integrally disposed upright on the base. In this case, a leading end part of the pressing piece can warp so as to provide the piezoelectric actuator with a force directed to the lens holder (barrel).

The pressing piece may exhibit an L shape having a leading end part projecting toward the piezoelectric actuator.

The base may have a wall member integrally disposed upright thereon and located on the opposite side of the piezoelectric actuator from the barrel, the pressing means being a protrusion provided on the wall member so as to project toward the piezoelectric actuator. In this case, an interaction between the first and second joints and the protrusion can provide the piezoelectric actuator with a force directed to the lens holder (barrel).

The present invention can provide a highly reliable lens drive device which is resistant to impact forces from the outside.

The present invention will be more fully understood from the detailed description given herein below and the accompanying drawings, which are given by way of illustration only, and thus are not to be considered as limiting the present invention.

BRIEF DESCRIPTION OF THE DRAWINGS

FIG. 23 is a perspective view illustrating the base of the lens drive device in accordance with the second embodiment as seen from the front side.

DESCRIPTION OF THE PREFERRED EMBODIMENTS

Figure 1:
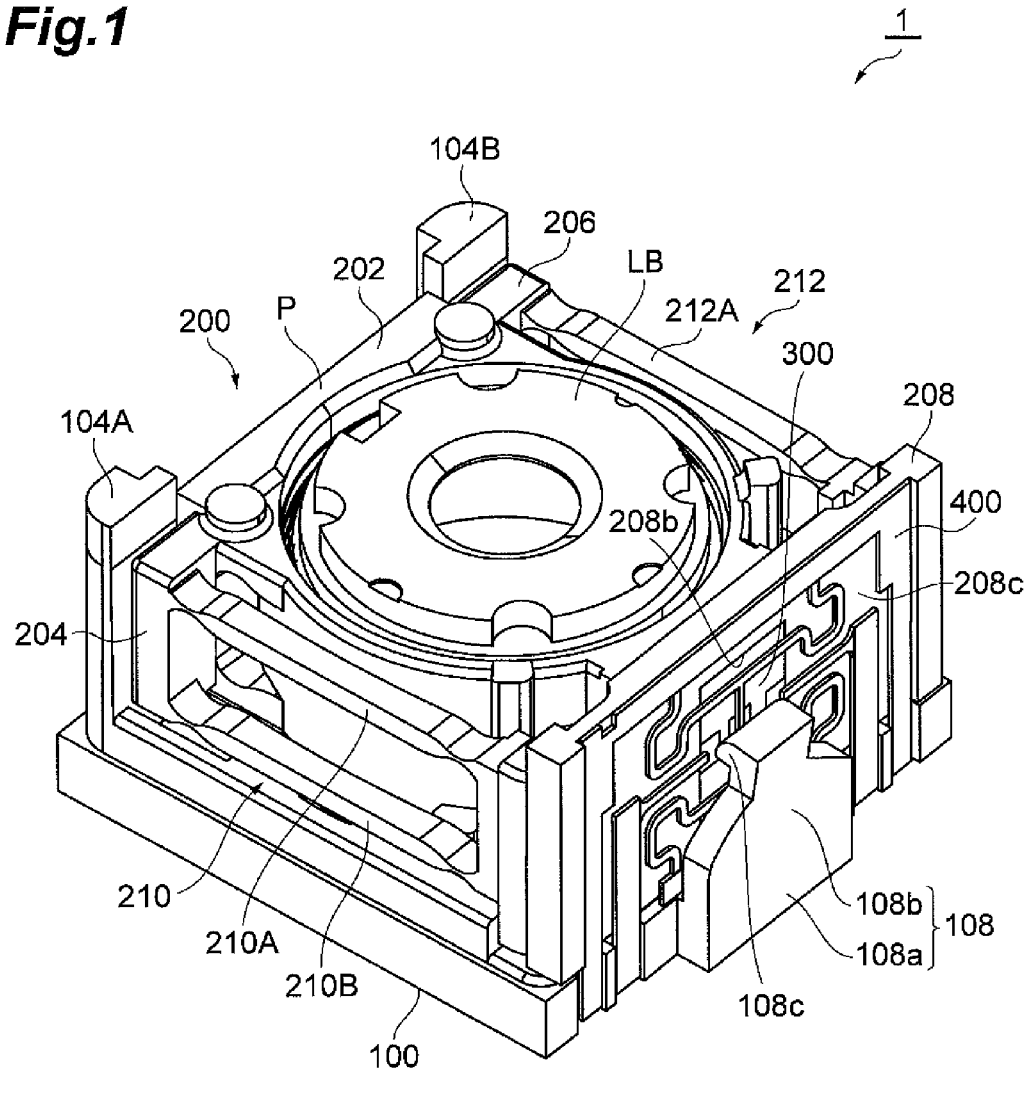
FIG. 1 is a perspective view illustrating the lens drive device in accordance with a first embodiment as seen from its back face side.

Embodiments of the present invention, which are illustrative but not limitative of the present invention, will be explained in detail with reference to the drawings. In the explanation, the same constituents or those having the same functions will be referred to with the same signs while omitting their overlapping descriptions.

First Embodiment

As illustrated in FIGS. 1 to 12, a lens drive device 1 comprises a base 100, a lens holder 200, a piezoelectric actuator 300, a conductive plate 400, and an undepicted cover. The lens drive device 1 is a device for driving a lens for a camera mounted to a mobile phone, for example. The size of the lens drive device 1 as seen from the upper side (in the Z direction) can be set to approximately 8.5 mm×8.5 mm, for example. The base 100, with the cover, functions as a housing in this embodiment.

Figure 6:
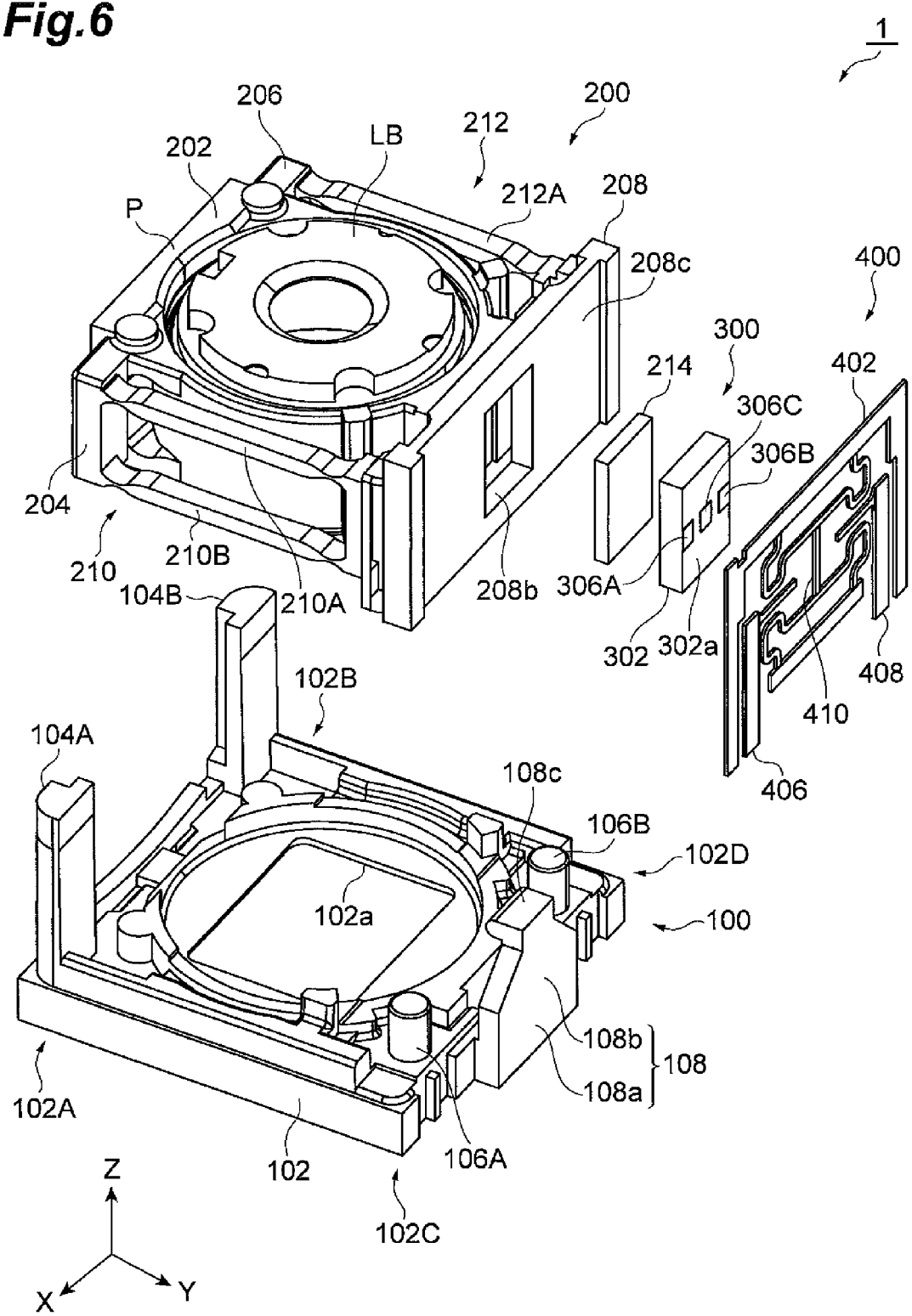
FIG. 6 is an exploded perspective view illustrating the lens drive device in accordance with the first embodiment as seen from the back face side.
Figure 7:
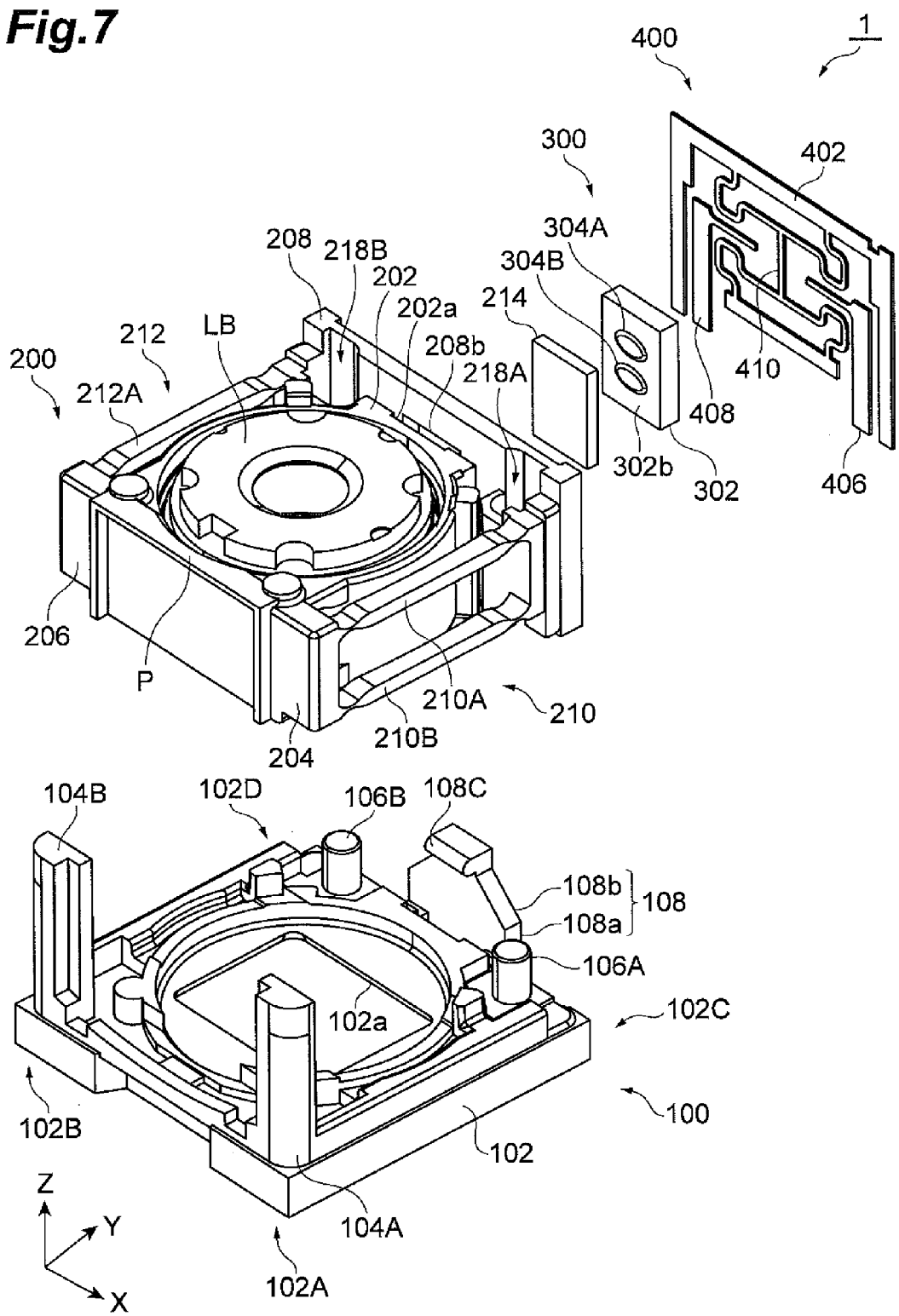
FIG. 7 is an exploded perspective view illustrating the lens drive device in accordance with the first embodiment as seen from its front face side.
Figure 8:
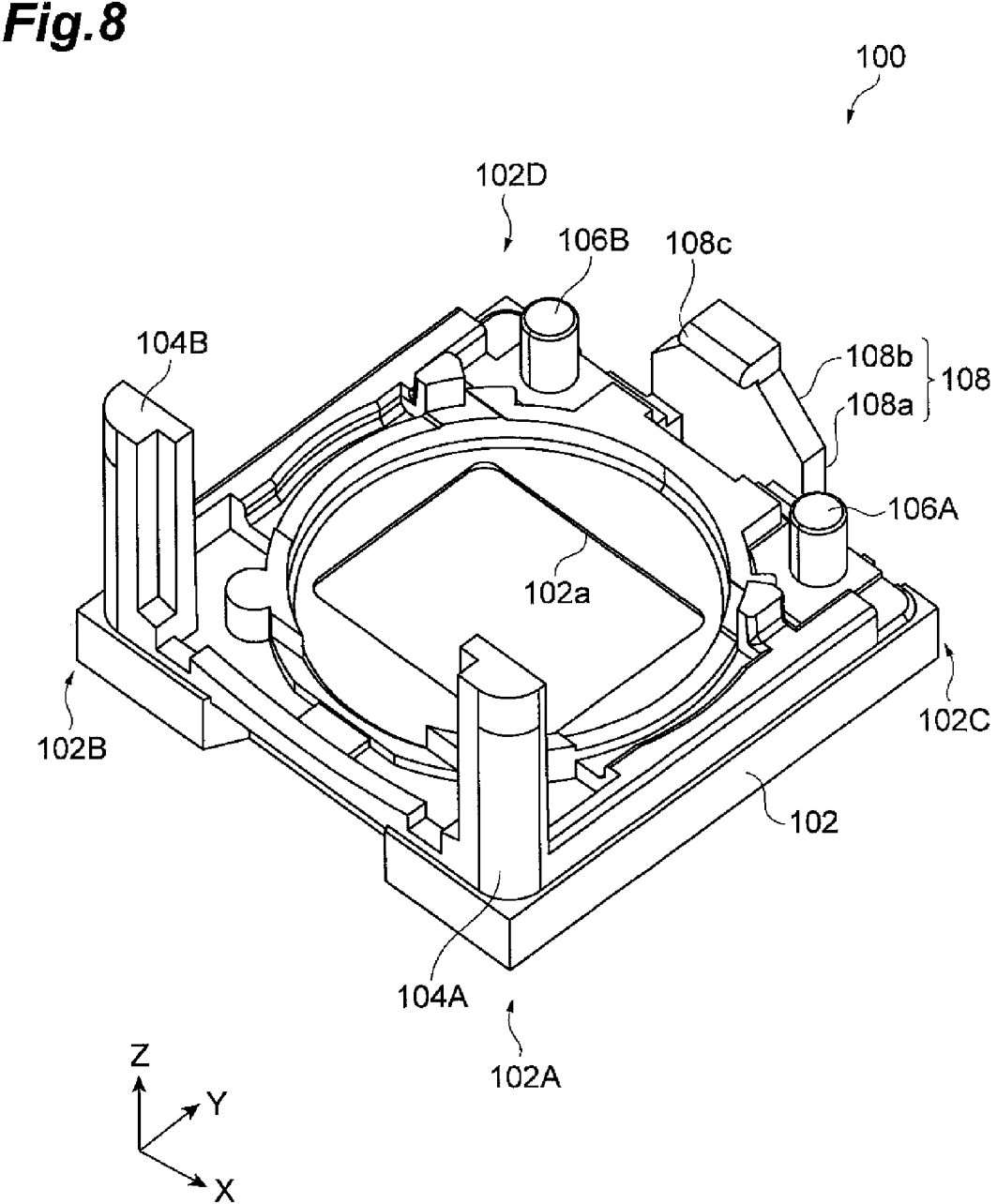
FIG. 8 is a perspective view illustrating a lens holder of the lens drive device in accordance with the first embodiment as seen from the back face side.
Figure 9:
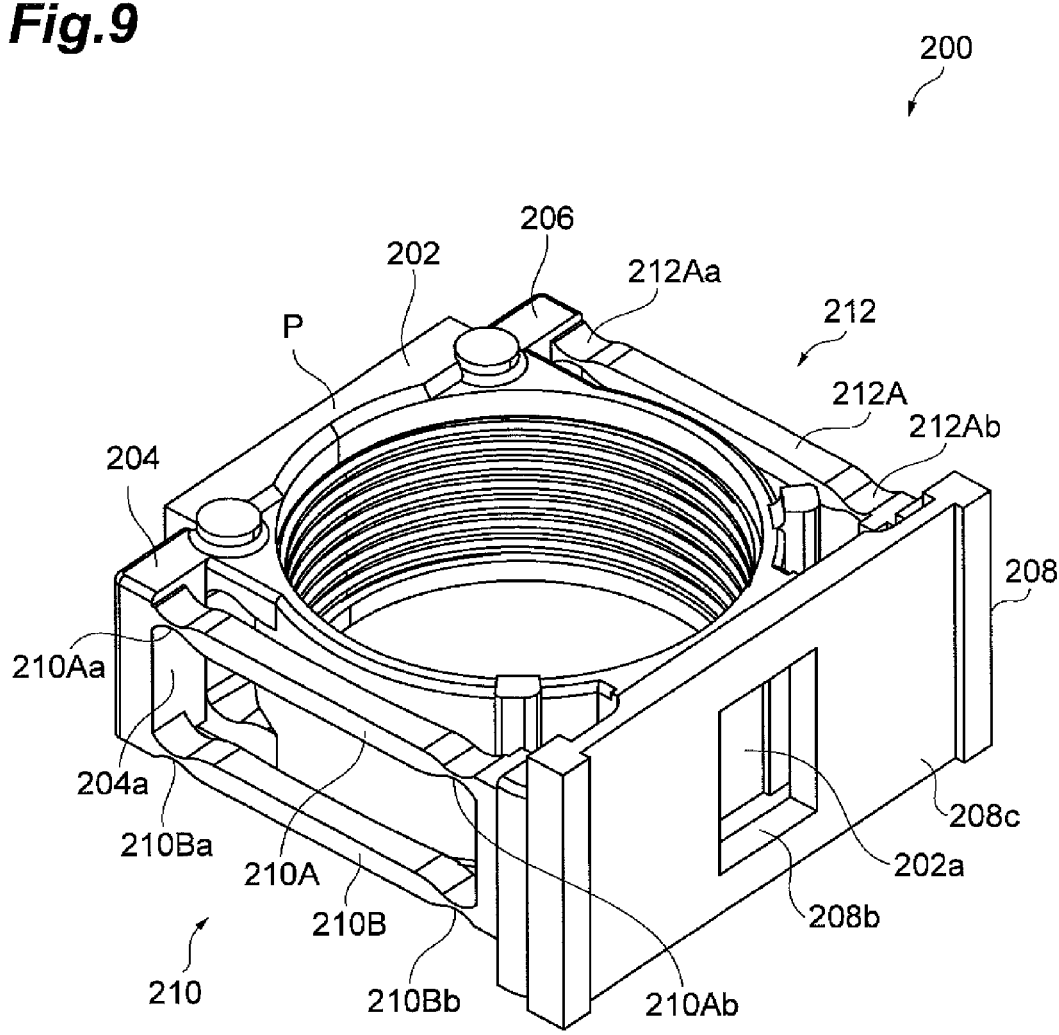
FIG. 9 is a perspective view illustrating the lens holder of the lens drive device in accordance with the first embodiment as seen from the front face side.

As illustrated in FIGS. 6 to 8, the base 100 has a bottom part 102, a pair of columns 104A, 104B, a pair of shafts 106A, 106B, and a pressing piece 108. The base 100 is formed from a liquid crystal polymer containing a filler of glass fiber, inorganic matters, and the like, for example.

The bottom part 102 is a board-like member exhibiting a substantially rectangular form in a planar view. The substantially rectangular form encompasses not only forms having right-angled corners, but also those with chamfered corners. The bottom part 102 has four corners 102A to 102D. The corner 102A is adjacent to the corners 102B, 102C; the corner 102B is adjacent to the corners 102A, 102D; the corner 102C is adjacent to the corners 102A, 102D; and the corner 102D is adjacent to the corners 102B, 102C. The bottom part 102 is formed with a rectangular opening 102a at a center portion thereof.

The pair of columns 104A, 104B are disposed upright on a main face of the bottom part 102 in the thickness direction of the bottom part 102 (Z-axis direction). The columns 104A, 104B are arranged near the corners 102A, 102B of the bottom part 102, respectively. The columns 104A, 104B function as attachment members for attaching the cover to the base 100. Therefore, the upper ends of the columns 104A, 104B are at about the same level as the upper end of the lens holder 200 in a state where the lens holder 200 is attached to the base 100. Whether the lens drive device 100 is driven or not, the columns 104A, 104B are separated from the lens holder 200.

The pair of shafts 106A, 106B, each having a circular columnar form, is disposed upright on the bottom part 102 in the thickness direction of the bottom part 102 (Z-axis direction). The shafts 106A, 106B are arranged near the corners 102C, 102D of the bottom part 102, respectively. The shafts 106A, 106B can be set to such a height that they can engage through-holes 218A, 218B of the lens holder 200, which will be explained later, respectively.

The pressing piece 108 has a base end part 108a exhibiting a rectangular form and a leading end part 108b exhibiting a trapezoidal form narrowing its width with distance from the base end part 108a. The base end part 108a, which is located between the pair of shafts 106, is integrally attached to the bottom part 102 at a side face thereof. The leading end part 108b is a free end. The leading end part 108b has a protrusion 108c projecting toward the columns 104 in the direction (Y-axis direction) along which the corners 102A, 102B oppose the corners 102C, 102D. That is, the pressing piece 108 exhibits an L shape and acts like a cantilever with respect to the bottom part 102. In a state where the lens drive device 1 is assembled, the pressing piece 108 is located on the opposite side of the piezoelectric actuator 300 and a main wall part 208 from a barrel 202.

The pair of columns 104, pair of shafts 106, and pressing piece 108 extend from the main face of the bottom part 102 to the same side.

As illustrated in FIGS. 2, 4, 6, 7, and 9 to 11, the lens holder 200 has the barrel 202, a pair of projections 204, 206, the main wall part 208, a pair of joints 210, 212, and a substrate 214. The lens holder 200 is formed from an elastomer, a carbon-fiber-containing liquid crystal polymer, or nylon, for example. It will be preferred if the lens holder 200 is formed from an elastomer, since it generates no noises such as abnormal sounds even when arm members 210A, 210B, 212A, 212B, which will be explained later, bend. As the elastomer, thermoplastic elastomers can be used, for example.

The barrel 202 exhibits a cylindrical form having an inner peripheral surface provided with a helical thread groove. A lens barrel LB containing a lens threadably engages the thread groove of the barrel 202, whereby the lens holder 200 holds the lens. The barrel 202 extends along the direction (Z direction) in which the pillars 104, shafts 106, and pressing piece 108 extend. In this embodiment, the optical axis direction of the lens is substantially the same as the axial direction of the barrel 202 (Z direction).

Each of the pair of projections 204, 206 is a board-like member exhibiting a rectangular form. The pair of projections 204, 206 project from the outer peripheral surface of the barrel 202 in directions (X directions) opposite from each other intersecting the optical axis direction of the lens (the axial direction of the barrel 202 i.e., Z direction). In other words, the pair of projections 204, 206 extend in a direction tangential to a given point P on the periphery of the barrel 202 as seen from the upper side (in the Z direction). In this embodiment, the point P is located closest to the columns 104A, 104B in the Y direction. In the projecting direction of the pair of projections 204, 206 (X direction), their leading ends are located on the outside of the outer peripheral surface of the barrel 202. The projection 204 has a surface 204a (see FIGS. 9 and 11) located closer to the barrel 202 in a direction (Y direction) intersecting its projecting direction (X direction). The projection 206 has a surface 206a (see FIGS. 10 and 11) located closer to the barrel 202 in a direction (Y direction) intersecting its projecting direction (X direction).

The main wall part 208 is a board-like member exhibiting a rectangular form. The main wall part 208 is located on the opposite side of the barrel 202 from the projections 204, 206 while being separated from the barrel 202. The main wall part 208 has a surface 208a opposing the surfaces 204a, 206a of the projections 204, 206 (see FIGS. 10 and 11). The surface 208a is substantially parallel to the surfaces 204a, 206a. Formed at a center portion of the main wall part 208 is a rectangular through-hole 208b having a size on a par with the outer form of the piezoelectric actuator 300.

The pair of joints 210, 212 are located so as to interpose the barrel 202 therebetween. The pair of joints 210, 212 extend in the same direction (toward the main wall part 208) from the projections 204, 206, respectively.

The joint 210 is located between the projection 204 and the main wall part 208 and joins them to each other. Specifically, the joint 210 has a pair of arm members 210A, 210B each having a quadrangular prism form. The pair of arm members 210A, 210B are arranged in a row in the optical axis direction of the lens (the axial direction of the barrel 202, i.e., Z direction) and extend substantially in parallel with each other in the direction in which the surface 204a of the projection 204 and the surface 208a of the main wall part 208 oppose each other (Y direction).

The arm members 210A, 210B have respective one end parts 210Aa, 210Ba connected to the surface 204a of the projection 204 and made thinner in the optical axis direction of the lens (the axial direction of the barrel 202, i.e., Z direction). Therefore, the one end parts 210Aa, 210Ba can warp, so as to become bendable with respect to the surface 204a of the projection 204. The arm members 210A, 210B have respective other end parts 210Ab, 210Bb connected to the surface 208a of the main wall part 208 and made thinner in the optical axis direction of the lens (the axial direction of the barrel 202, i.e., Z direction). Therefore, the other end parts 210Ab, 210Bb can warp, so as to become bendable with respect to the surface 208a of the main wall part 208.

Thus, as illustrated in FIGS. 2, 6, 7, and 9, the arm members 210A, 210B, projection 204, and main wall part 208 form a parallelogram. Therefore, restraining one side (the main wall part 208 in this embodiment) of the parallelogram can translate the side (the projection 204 in this embodiment) opposite to the one side. Hence, the barrel 202 provided with the projection 204 is movable in the optical axis direction of the lens (the axial direction of the barrel 202, i.e., Z direction) so as to move closer to and away from the base 100.

Arranged on the surface 208a of the main wall part 208 is an auxiliary wall part 216A exhibiting an L shape directed to the other end parts 210Ab, 210Bb of the arm members 210A, 210B. That is, the auxiliary wall part 216A joins the main wall part 208 and the joint 210 (arm members 210A, 210B) to each other. A space defined by the main wall part 208, joint 210, and auxiliary wall part 216A construct a through-hole 218A extending in the optical axis direction of the lens (the axial direction of the barrel 202, i.e., Z direction).

The joint 212 is located between the projection 206 and the main wall part 208 and joins them to each other. Specifically, the joint 212 has a pair of arm members 212A, 212B each having a quadrangular prism form. The pair of arm members 212A, 212B are arranged in a row in the optical axis direction of the lens (the axial direction of the barrel 202, i.e., Z direction) and extend substantially in parallel with each other in the direction in which the surface 206a of the projection 206 and the surface 208a of the main wall part 208 oppose each other (Y direction).

The arm members 212A, 212B have respective one end parts 212Aa, 212Ba connected to the surface 206a of the projection 206 and made thinner in the optical axis direction of the lens (the axial direction of the barrel 202, i.e., Z direction). Therefore, the one end parts 212Aa, 212Ba can warp, so as to become bendable with respect to the surface 206a of the projection 206. The arm members 212A, 212B have respective other end parts 212Ab, 212Bb connected to the surface 208a of the main wall part 208 and made thinner in the optical axis direction of the lens (the axial direction of the barrel 202, i.e., Z direction). Therefore, the other end parts 212Ab, 212Bb can warp, so as to become bendable with respect to the surface 208a of the main wall part 208.

Figure 10:
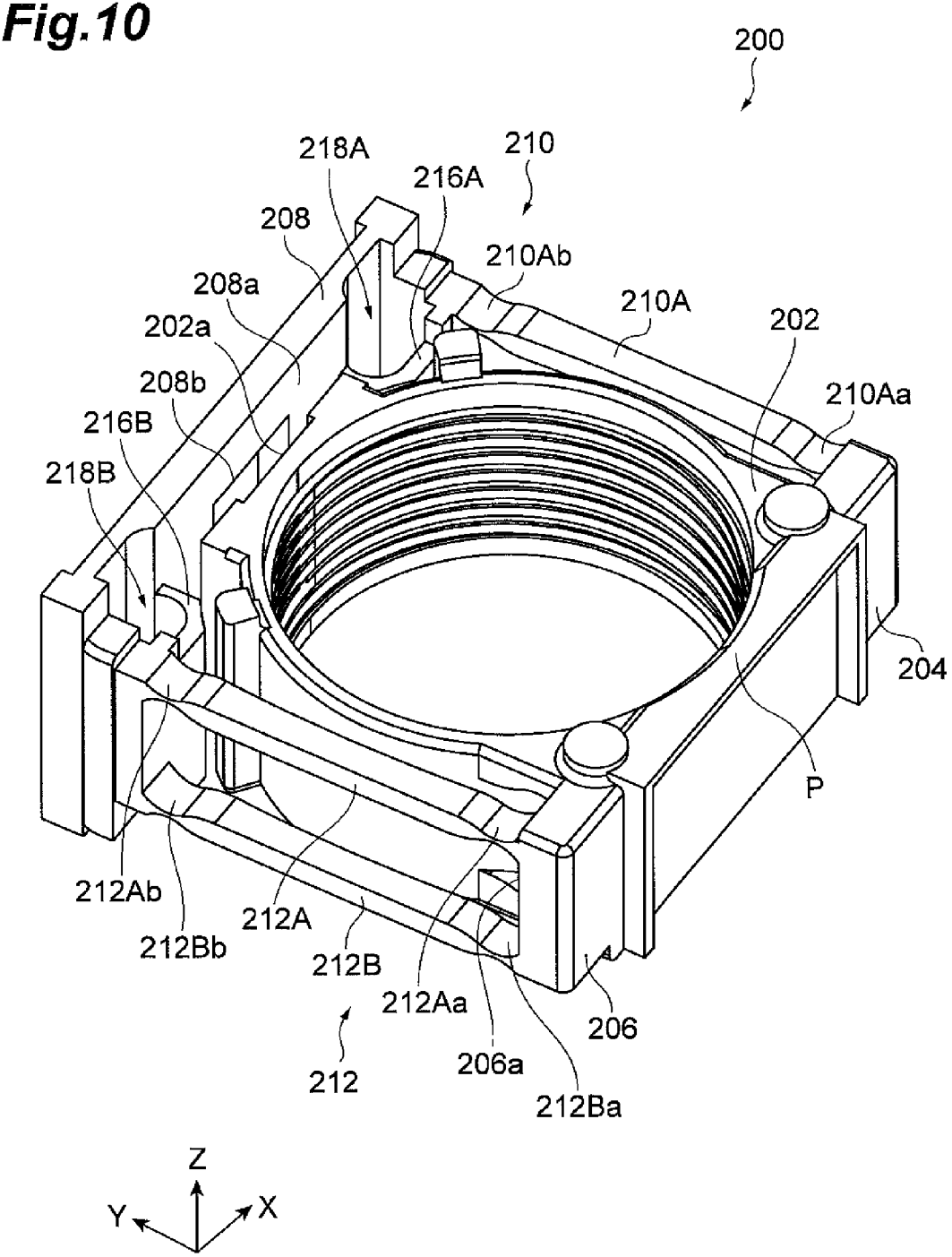
FIG. 10 is a top plan view illustrating the lens holder of the lens drive device in accordance with the first embodiment.
Figure 11:
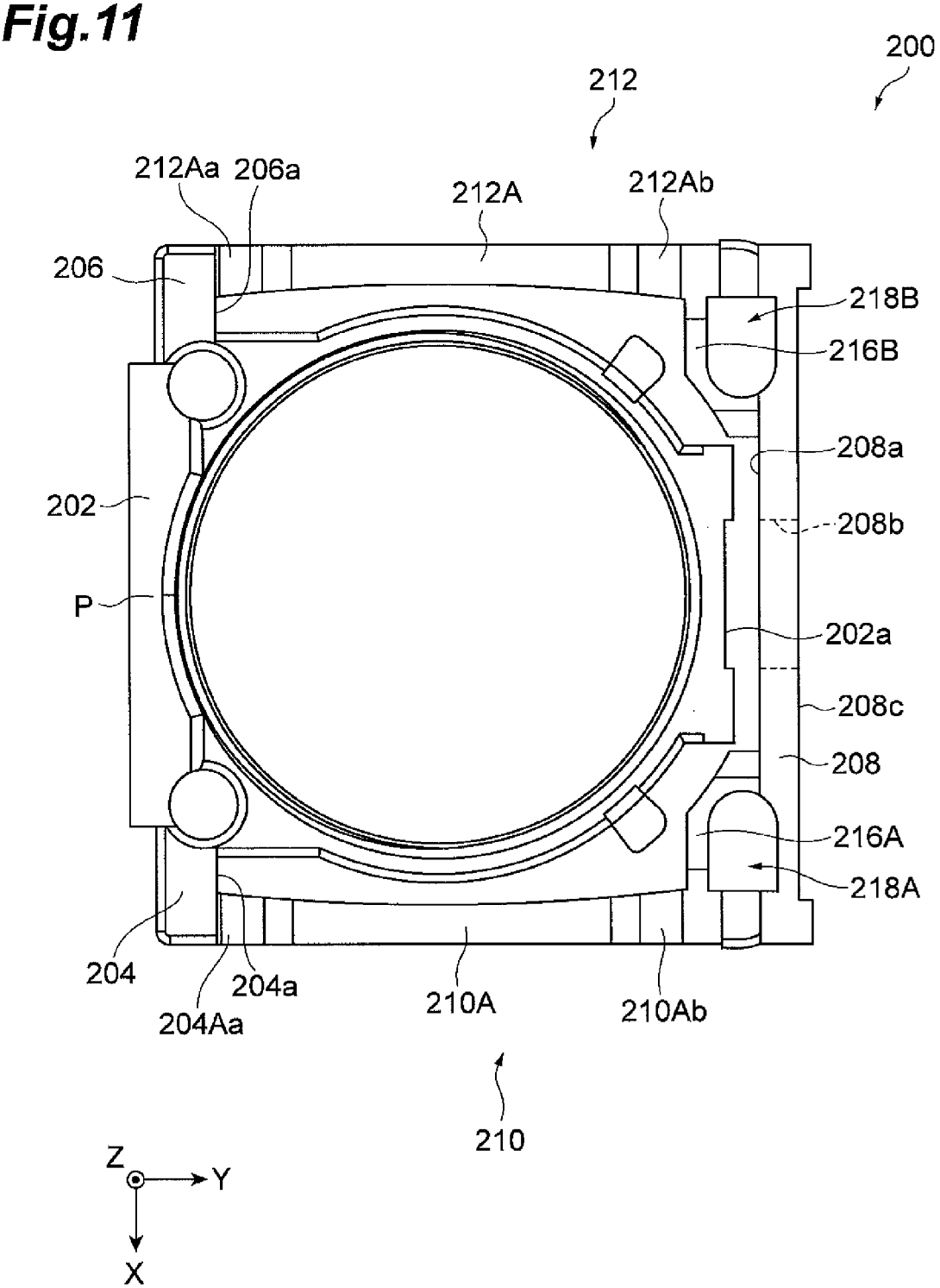
FIG. 11 is a perspective view illustrating the base of the lens drive device in accordance with the first embodiment as seen from the front side.

As illustrated in FIG. 10, the arm members 212A, 212B, projection 206, and main wall part 208 form a parallelogram. Therefore, restraining one side (the main wall part 208 in this embodiment) of the parallelogram can translate the side (the projection 206 in this embodiment) opposite to the one side. Hence, the barrel 202 provided with the projection 206 is movable in the optical axis direction of the lens (the axial direction of the barrel 202, i.e., Z direction) so as to move closer to and away from the base 100.

Arranged on the surface 208a of the main wall part 208 is an auxiliary wall part 216B exhibiting an L shape directed to the other end parts 212Ab, 212Bb of the arm members 212A, 212B. That is, the auxiliary wall part 216B joins the main wall part 208 and the joint 212 (arm members 212A, 212B) to each other. A space defined by the main wall part 208, joint 212, and auxiliary wall part 216B construct a through-hole 218B extending in the optical axis direction of the lens (the axial direction of the barrel 202, i.e., Z direction).

Figure 2:
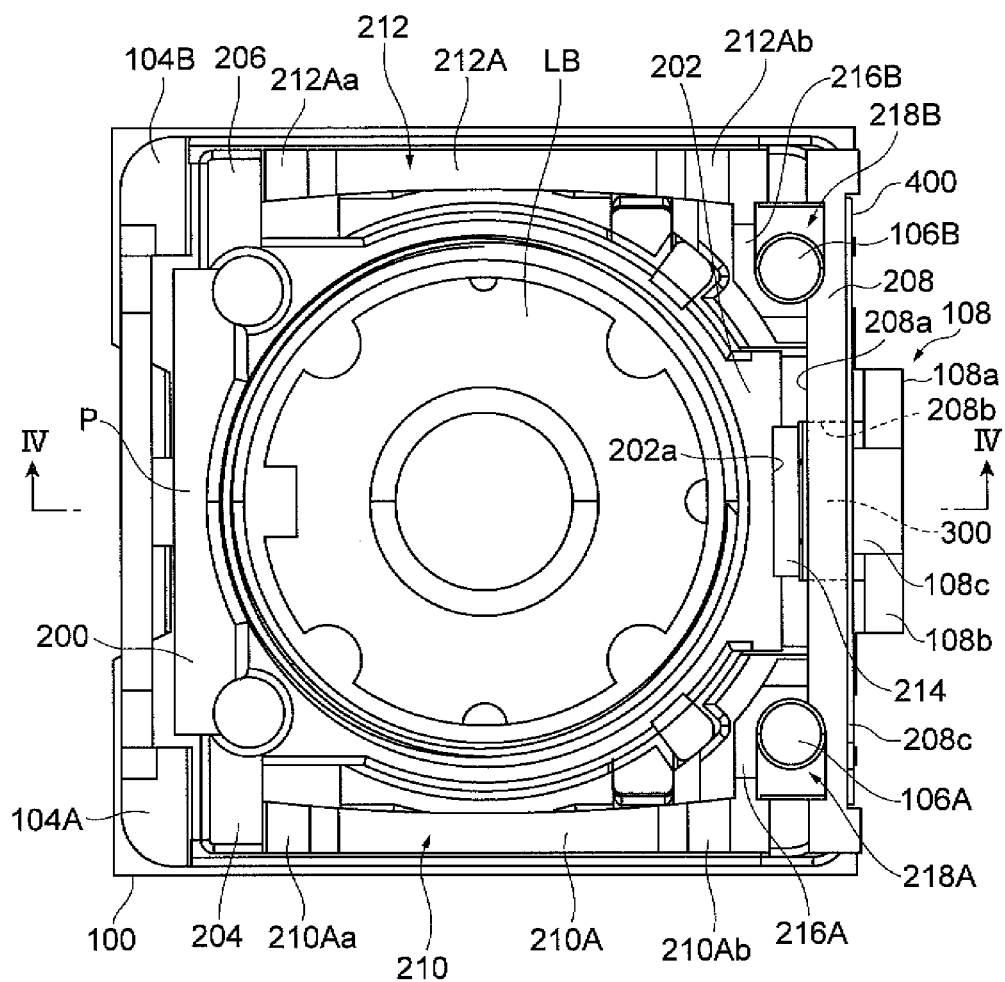
FIG. 2 is a top plan view illustrating the lens drive device in accordance with the first embodiment.
Figure 3:
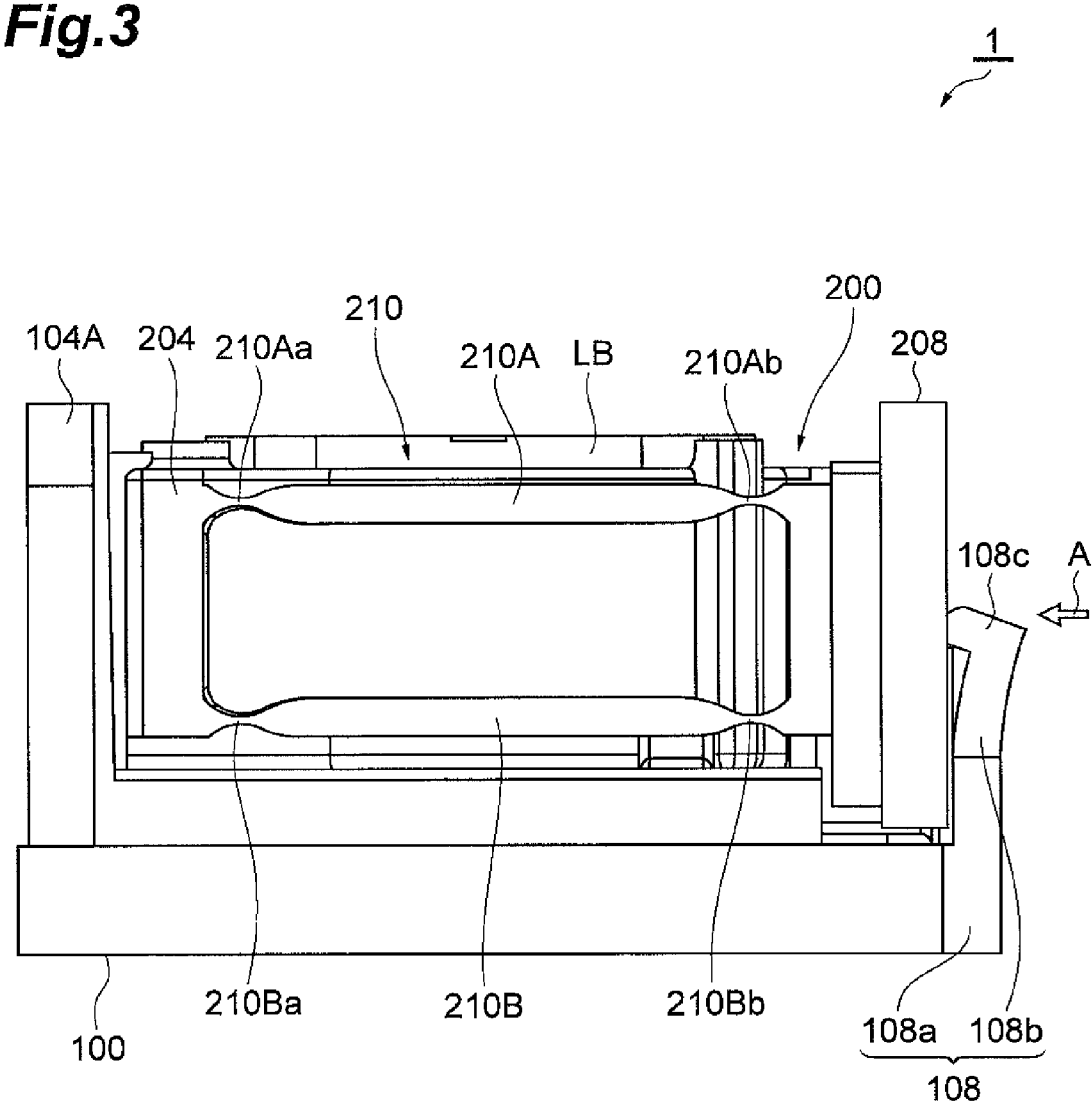
FIG. 3 is a side view illustrating the lens drive device in accordance with the first embodiment.

As illustrated in FIG. 2, the shafts 106A, 106E are inserted in the through-holes 218A, 218B, respectively. The through-holes 218A, 218B engage the shafts 106A, 106B, so as to attach the main wall part 208 to the base 100 and inhibit the lens holder 200 from moving in a direction (X or Y direction) intersecting the extending direction of the shafts 106A, 106B (Z direction). As a result, the main wall part 208 is disposed upright on the base 100 and does not move with respect to the base 100. On the other hand, the arm members 210A, 210B are bendable with respect to the projection 204 and main wall part 208, while the arm members 212A, 212B are bendable with respect to the projection 206 and main wall part 208, whereby the barrel 202 joined to the main wall part 208 through the projections 204, 206 and joints 210, 212 is supported on the base 100 by the main wall part 208 while being movable in the optical axis direction of the lens (the axial direction of the barrel 202, i.e., Z direction) so as to move closer to and away from the base 100.

The substrate 214 is a board-like member exhibiting a rectangular form. The substrate 214 is attached to a region (opposing the surface 208a of the main wall part 208) 202a on the opposite side of the outer peripheral surface of the barrel 202 from the projections 204, 206. The substrate 214 substantially functions as the outer peripheral surface of the barrel 202. The substrate 214 is constituted by SiC or zirconia, for example. The substrate 214 may be formed integrally with the lens holder 200.

Figure 12:
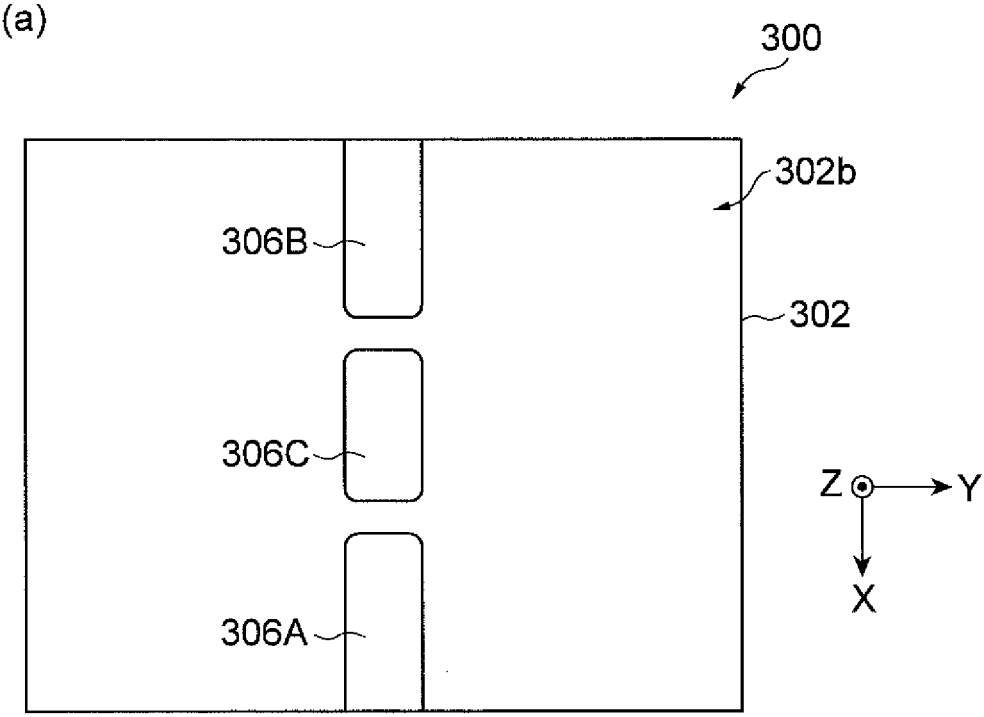
FIG. 12 illustrates a piezoelectric actuator.
Figure 12:
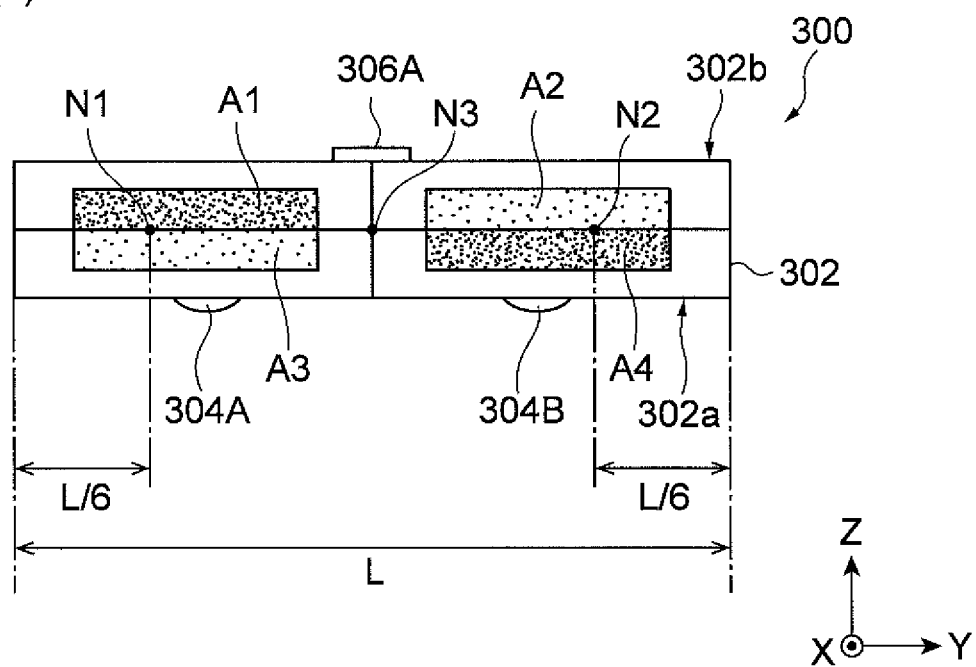
Figure 13:
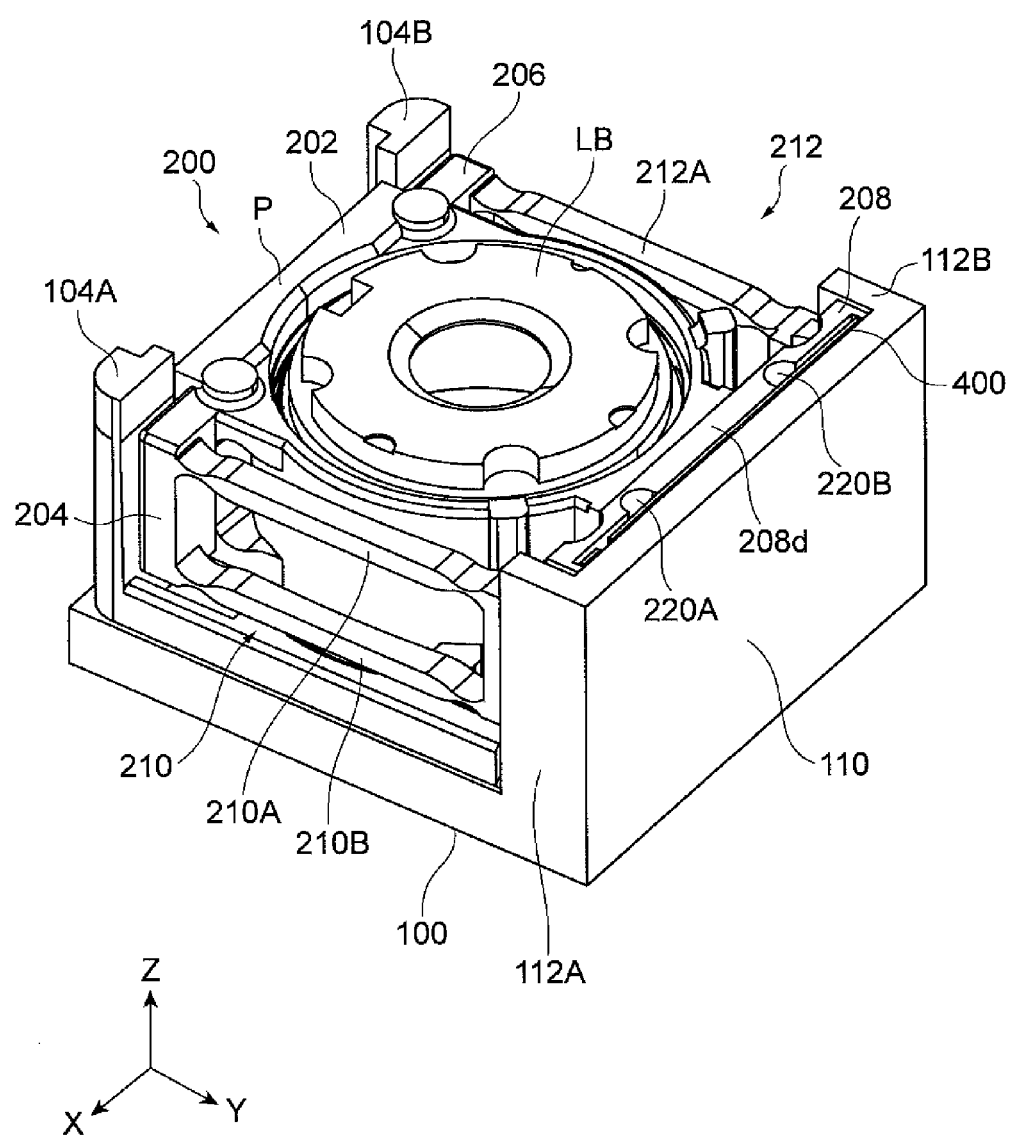
FIG. 13 is a perspective view illustrating the lens drive device in accordance with a second embodiment as seen from its back face side.
Figure 14:
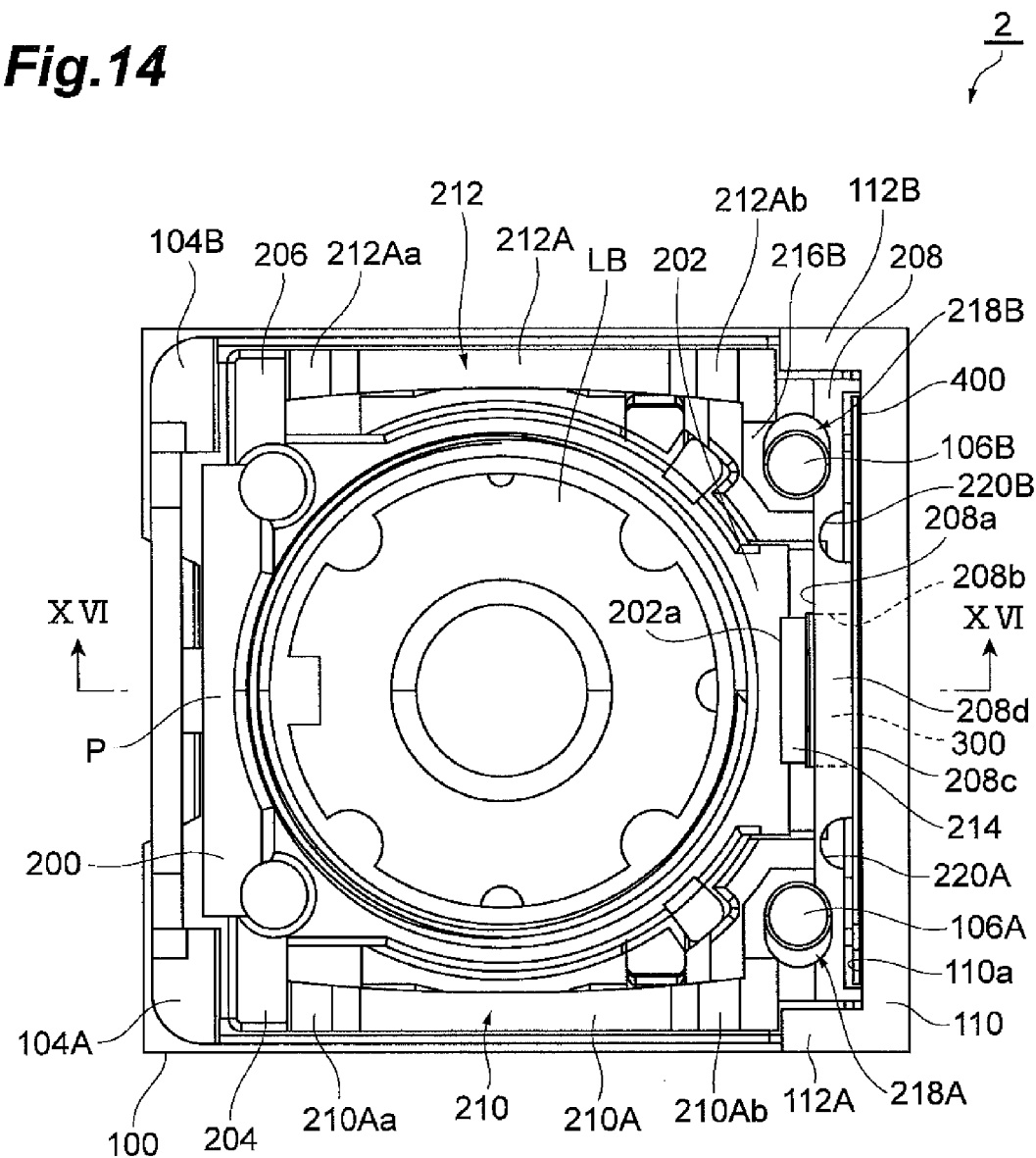
FIG. 14 is a top plan view illustrating the lens drive device in accordance with the second embodiment.
Figure 15:
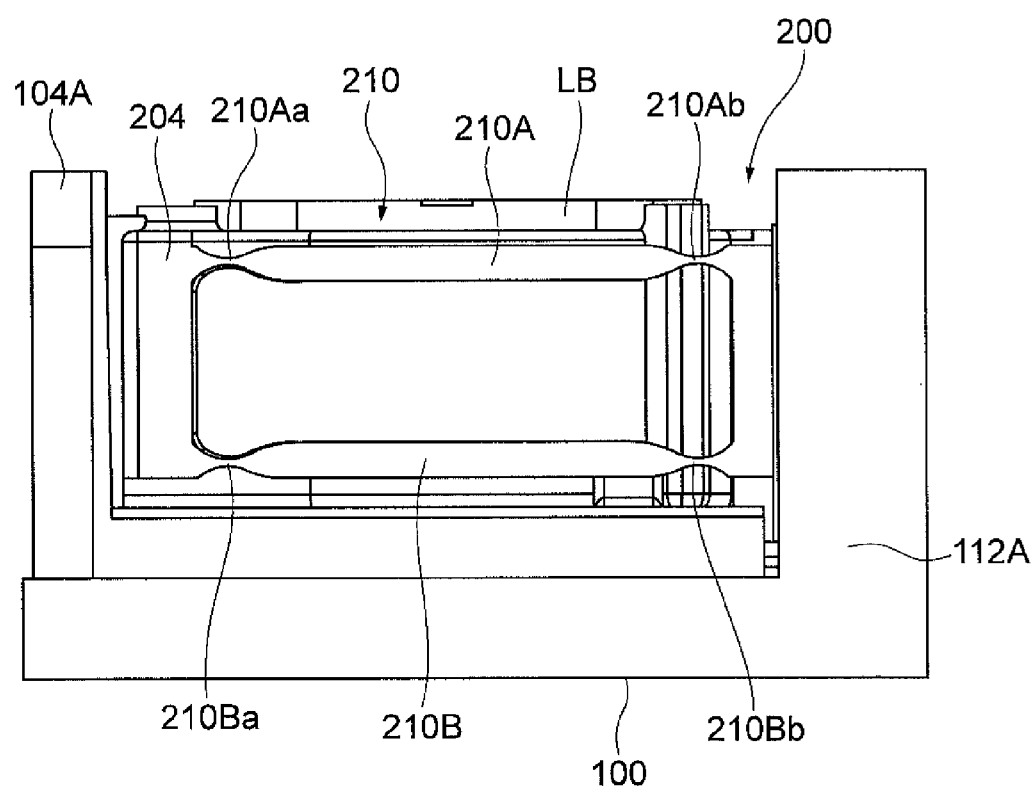
FIG. 15 is a side view illustrating the lens drive device in accordance with the second embodiment.
Figure 16:
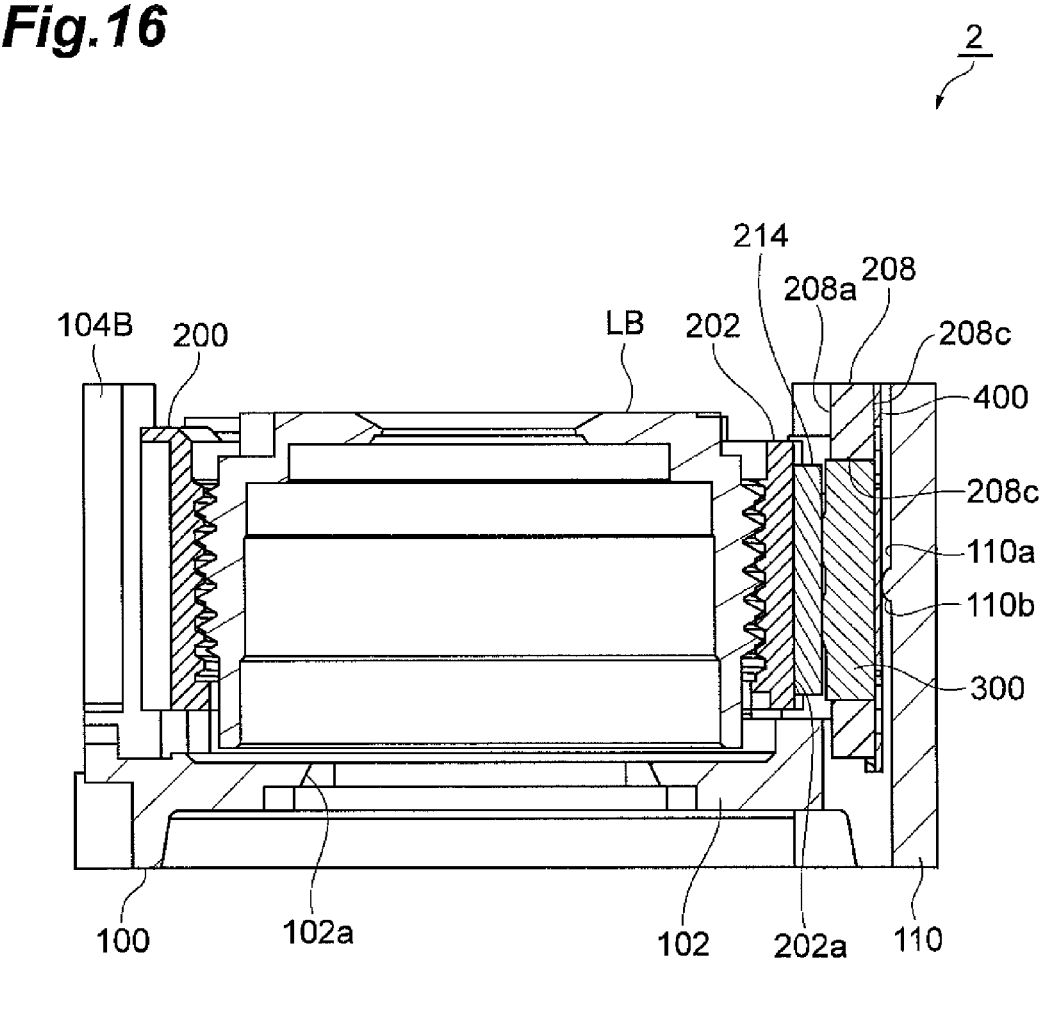
FIG. 16 is a sectional view taken along the line XVI-XVI of FIG. 14.
Figure 17:
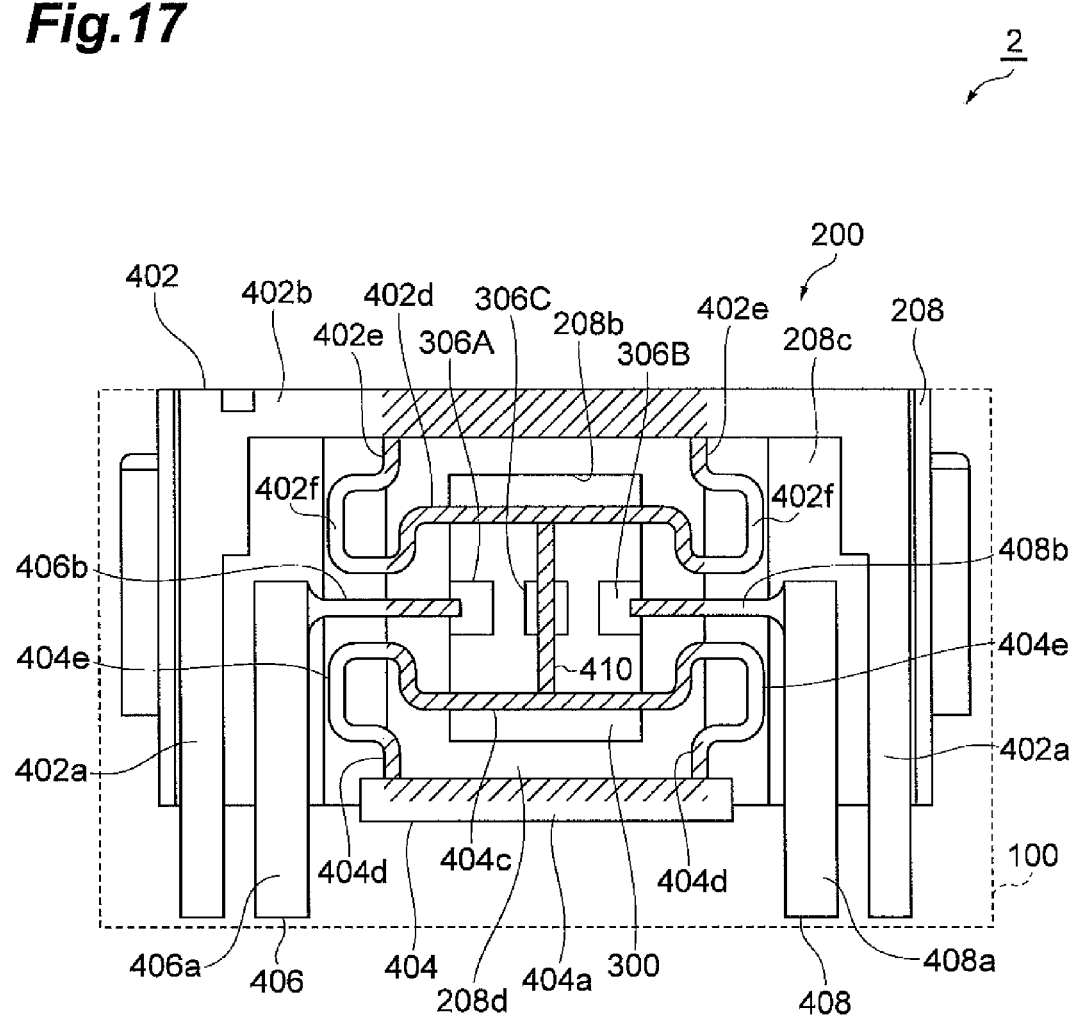
FIG. 17 is a diagram illustrating the back face of the lens drive device in accordance with the second embodiment as seen through its base.

As illustrated in FIG. 12, the piezoelectric actuator 300 has an element 302 exhibiting a rectangular parallelepiped form, a pair of frictional parts 304A, 304B, and outer electrodes 306A to 306C. The element 302 is a so-called multilayer piezoelectric element. The element 302 has a pair of main faces 302a, 202b opposing each other. The element 302 is configured to have a length of about 2.5 mm, for example. The element 302 is configured to have a thickness of about 0.5 mm, for example. The element 302 is configured to have a width of about 1.8 mm, for example. The element 302 has therewithin a plurality of (four in this embodiment) active parts A1 to A4 which expand and contract according to a voltage value applied.

The active part A1 includes a first inner electrode, a grounding inner electrode, and a piezoelectric layer held between these electrodes (none of them being depicted). The active part A2 includes a second inner electrode, a grounding inner electrode, and a piezoelectric layer held between these electrodes (none of them being depicted). The active part A3 includes a third inner electrode, a grounding inner electrode, and a piezoelectric layer held between these electrodes (none of them being depicted). The active part A4 includes a fourth inner electrode, a grounding inner electrode, and a piezoelectric layer held between these electrodes (none of them being depicted).

The active parts A1, A2 are arranged along a direction orthogonal to a direction in which the main faces 302a, 302b oppose each other. The active parts A3, A4 are arranged along the direction orthogonal to the direction in which the main faces 302a, 302b oppose each other. The active parts A1, A3 are arranged adjacent to each other along the direction in which the main faces 302a, 302b oppose each other. The active parts A2, A4 are arranged adjacent to each other along the direction in which the main faces 302a, 302b oppose each other.

A pair of frictional parts 304A, 304B, each exhibiting an elliptical form when seen in the direction in which the main faces 302a, 302b oppose each other, are disposed on the main face 302a of the element 302 so as to project therefrom. The pair of frictional parts 304A, 304B are arranged so as to be separated from each other in a direction in which the active parts A1, A2 (active parts A3, A4) are arranged (hereinafter referred to as arrangement direction). Each of the frictional parts 304A, 304B extends along a direction (X direction) orthogonal to both of the arrangement direction and the direction in which the main faces 302a, 302b oppose each other. The frictional parts 302a, 302b are configured to have a height of about 50 μm each, for example.

Figure 4:
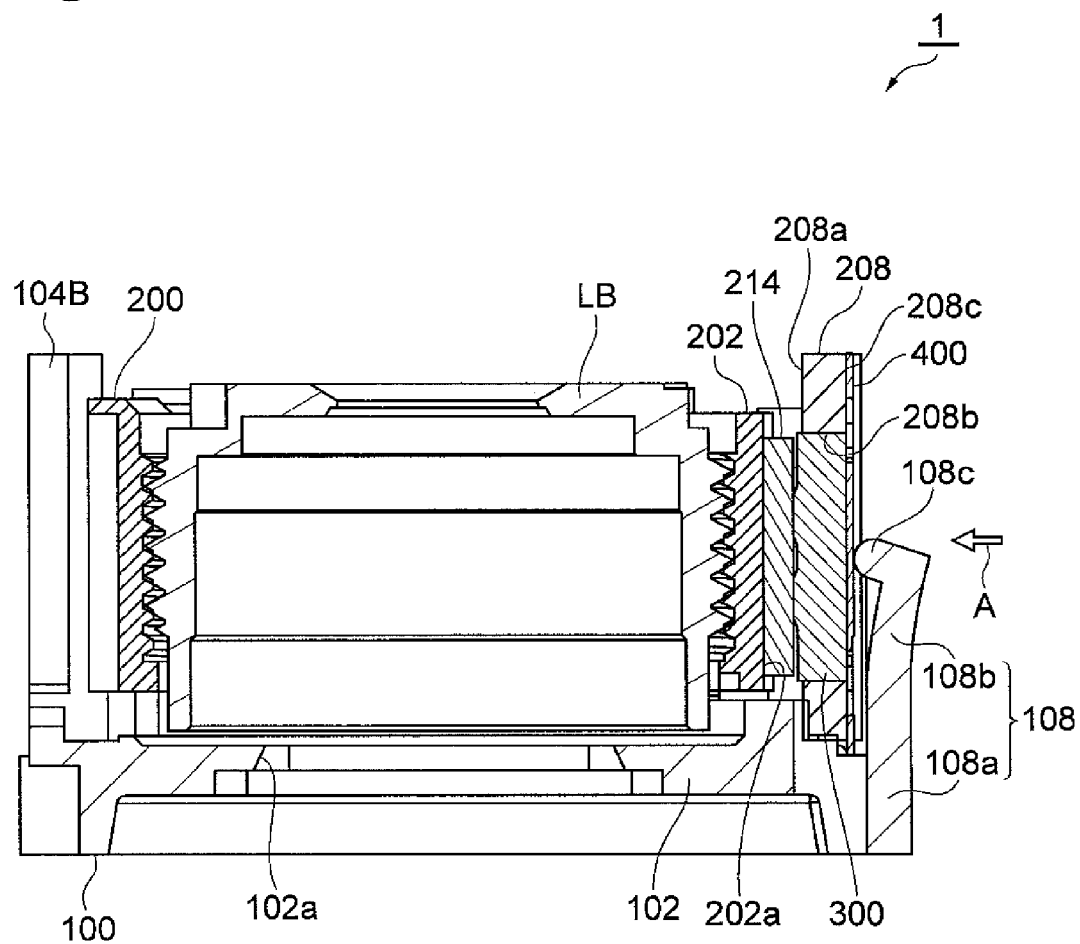
FIG. 4 is a sectional view taken along the line IV-IV of FIG. 2.

In a state where the lens drive device 1 is assembled, the piezoelectric actuator 300 is arranged within the through-hole 208b of the main wall part 208 such that the main face 302a of the element 302 opposes the barrel 202 (substrate 214) as illustrated in FIGS. 2 and 4. When the protrusion 108c of the pressing piece 108 comes into contact with the main face 302b of the element 302 in this state, the pressing piece 108 bends away from the lens holder 200 as illustrated in FIGS. 1 to 4. The bent pressing piece 108 acts to restore its original form and thus presses the piezoelectric actuator 300 against the barrel 202 through a joint 410 which will be explained later (see arrow A in FIGS. 3 and 4). As a result, both of the frictional parts 304A, 304B are in contact with the outer peripheral surface of the barrel 202 (the surface of the substrate 214) when not driven.

When driven, the element 302 has two resonance modes, i.e., a longitudinal vibration mode (first vibration mode) vibrating in the longitudinal direction of the element 302 (arrangement direction) and a bending vibration mode (second vibration mode) into the thickness direction of the element 302 (the direction in which the main faces 302a, 302b oppose each other). The element 302 is vibrated by superposition of the longitudinal vibration mode and the bending vibration mode.

Specifically, driving the element 302 by applying voltages having phases shifted from each other by 90° to a set of the first and fourth inner electrodes and a set of the second and third inner electrodes, respectively, imparts elliptical movements having phases shifted from each other by 180° to the frictional parts 304A, 304B, respectively. As a result of the elliptical movements, frictional forces alternately act on the outer peripheral surface of the barrel 202 (the surface of the substrate 214).

Expanding the active parts A1, A4 and contracting the active parts A2, A3 bends the element 302 into an S shape as seen laterally (in the X direction) and minutely rotates it. Since the pressing piece 108 presses the piezoelectric actuator 300 against the barrel 202, one frictional part 304B comes into contact with the outer peripheral surface of the barrel 202 (the surface of the substrate 214) and imparts a pressing force to the barrel 202, while the other frictional part 304A moves away from the outer peripheral surface of the barrel 202 (the surface of the substrate 214) or does not impart the pressing force to the barrel 202 (exerts no force between the frictional part 304A and the barrel 202 in the Z direction) while keeping contact with the outer peripheral surface of the barrel 202 (the surface of the substrate 214). As a result, a frictional force occurs between the frictional part 304B and the outer peripheral surface of the barrel 202 (the surface of the substrate 214). The main wall part 208 is attached to the base 100, while the piezoelectric actuator 300 is held within the through-hole 208b of the main wall part 208, whereby the barrel 202 moves along the optical axis direction of the lens (the axial direction of the barrel 202, i.e., Z direction).

Expanding the active parts A2, A3 and contracting the active parts A1, A4 bends the element 302 into an S shape as seen laterally (in the X direction) and minutely rotates it. Since the pressing piece 108 presses the piezoelectric actuator 300 against the barrel 202, one frictional part 304A comes into contact with the outer peripheral surface of the barrel 202 (the surface of the substrate 214) and imparts a pressing force to the barrel 202, while the other frictional part 304B moves away from the outer peripheral surface of the barrel 202 (the surface of the substrate 214) or does not impart the pressing force to the barrel 202 (exerts no force between the frictional part 304B and the barrel 202 in the Z direction) while keeping contact with the outer peripheral surface of the barrel 202 (the surface of the substrate 214). As a result, a frictional force occurs between the frictional part 304A and the outer peripheral surface of the barrel 202 (the surface of the substrate 214). The main wall part 208 is attached to the base 100, while the piezoelectric actuator 300 is held within the through-hole 208b of the main wall part 208, whereby the barrel 202 moves along the optical axis direction of the lens (the axial direction of the barrel 202, i.e., Z direction) oppositely to the moving direction caused by the frictional part 304B.

In the example illustrated in (b) of FIG. 12, the element 302 has three node points N1 to N3. In a boundary part between the active parts A1, A3, the node point N1 is located at about L/6 inside from an end part of the element 302, where L is the length of the element 302 in the longitudinal direction thereof (arrangement direction of the active parts A1 to A4). In a boundary part between the active parts A2, A4, the node point N2 is located at about L/6 inside from an end part of the element 302. The node point N3 is in a center part in the longitudinal and thickness directions of the element 302. Hence, the node point N3 is located between the node points N1 and N2. The node points N1, N2 are points yielding the smallest displacement in the thickness direction, while exhibiting displacements in the longitudinal direction of the element 302. The node point N3 is a point yielding the smallest displacement in both of the longitudinal and thickness directions of the element 302.

As illustrated in FIG. 12, the outer electrodes 306A to 306C are disposed on the main face 302b of the element 302. Each of the electrodes 306A to 306C extends along the direction (Z direction) orthogonal to both of the arrangement direction of the active parts A1 to A4 and the direction in which the main faces 302a, 302b oppose each other. The electrodes 306A, 306C, 306B are arranged in this order while being separated from each other in the Z direction.

The outer electrode 306A is electrically connected to the first and fourth inner electrodes. The outer electrode 306B is electrically connected to the second and third inner electrodes. The outer electrode 306C is electrically connected to all the grounding inner electrodes. The outer electrodes 306A to 306C overlap the node point N3 when seen in the direction in which the main faces 302a, 302b oppose each other. The outer electrodes 306A to 306C are configured to have a thickness of about 2 μm each, for example.

Figure 5:
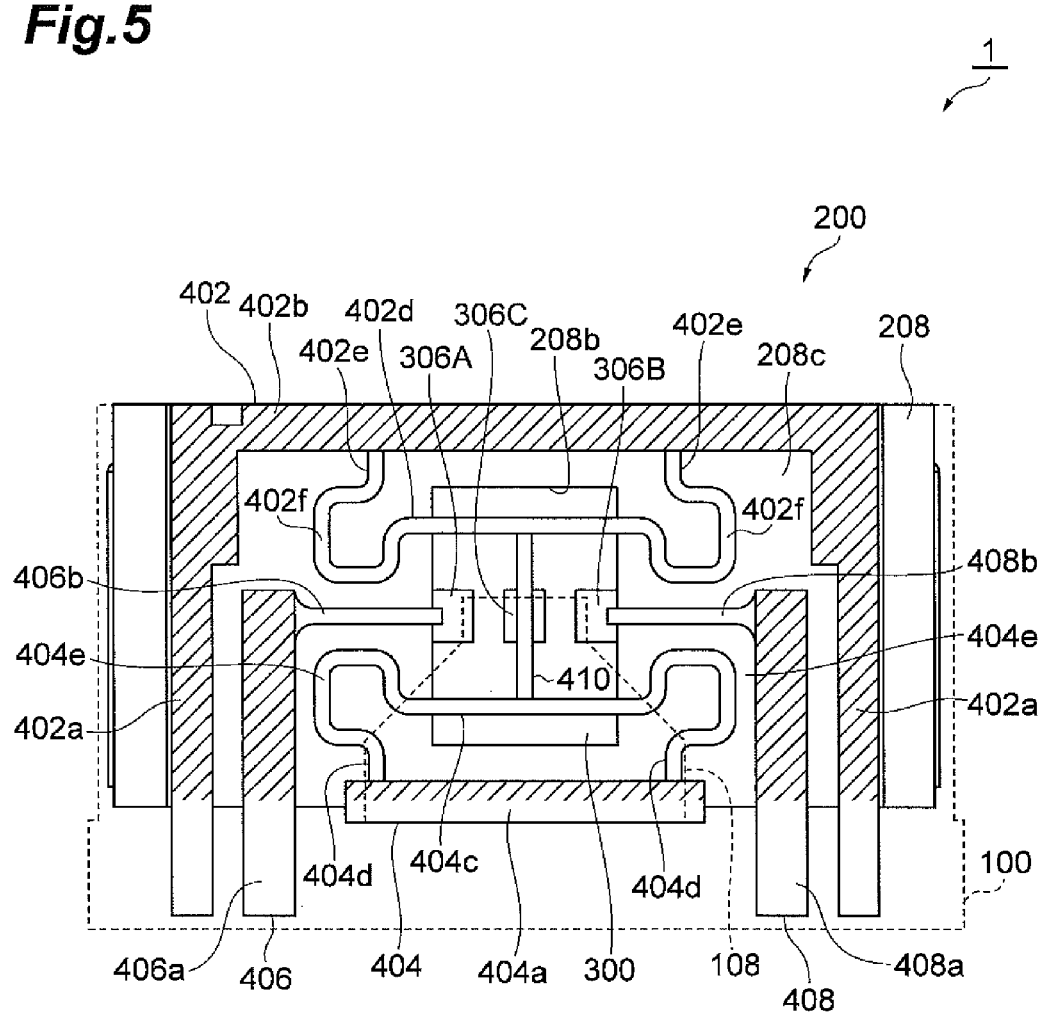
FIG. 5 is a diagram illustrating the back face of the lens drive device in accordance with the first embodiment as seen through its base.
Figure 5:
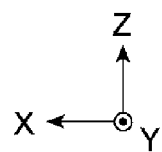

The conductive plate 400 is an elastic board-like body such as a leaf spring, for example. The conductive plate 400 is constituted by stainless steel, for example. As illustrated in FIGS. 5 to 7, the conductive plate 400 is attached to a surface 208c of the main wall part 208 on the side opposite from the surface 208a. The conductive plate 400 has first and second leads 402, 404 connected to the outer electrode 306C, a third lead 406 connected to the outer electrode 306A, and a fourth lead 408 connected to the outer electrode 306B.

As illustrated in FIG. 5, the first lead 402 has a pair of frame parts 402a, 402a extending along the optical axis direction of the lens (the axial direction of the barrel 202, i.e., Z direction), a frame part 402b extending so as to connect the leading ends of the frame parts 402a, 402a to each other, and a lead part 402c connected to the frame part 402b. In the frame parts 402a, 402b, portions (hatched in FIG. 5) overlapping the surface 208c of the main wall part 208 is bonded to the main wall part 208 with an adhesive or the like. The lead part 402c has a linear part 402d extending along the frame part 402b, a pair of end parts 402e, 402e connected to the frame part 402b on both sides of the through-hole 208b (piezoelectric actuator 300), and joints 402f, 402f extending from both ends of the linear part 402d to the end parts 402e, 402e.

The second lead 404 has a frame part 404a extending between the frame parts 402a, 402a at a position closer to the base 100 than is the through-hole 208b (piezoelectric actuator 300) and a lead part 404b connected to the frame part 404a. In the frame part 404a, a portion (hatched in FIG. 5) overlapping the surface 208c of the main wall part 208 is bonded to the main wall part 208 with an adhesive or the like. The lead part 404b has a linear part 404c extending along the frame part 404a, a pair of end parts 404d, 404d connected to the frame part 404a on both sides of the through-hole 208b (piezoelectric actuator 300), and joints 404e, 404e extending from both ends of the linear part 404c to the end parts 404d, 404d.

The linear part 404c of the second lead 404 is connected to the linear part 402d of the first lead 402 by the joint 410 extending along the optical axis direction of the lens (the axial direction of the barrel 202, i.e., Z direction). The joint 410 is in contact with the outer electrode 306C. Therefore, the first and second leads 402, 404 are electrically connected to the outer electrode 306C through the joint 410. In the first embodiment, the joint 410 is not attached to the outer electrode 306C by bonding or the like.

The third lead 406 has a frame part 406a and a connection part 406b. The frame part 406a is located between the frame part 402a of the first lead 402 and the second lead 404 and extends along the optical axis direction of the lens (the axial direction of the barrel 202, i.e., Z direction). In the frame part 406a, a portion (hatched in FIG. 5) overlapping the surface 208c of the main wall part 208 is bonded to the main wall part 208 with an adhesive or the like. The connection part 406b is located between the lead part 402c of the first lead 402 and the lead part 404b of the second lead 404 and extends along the frame parts 402a, 404a. The leading end of the connection part 406b is in contact with the outer electrode 306A. Therefore, the third lead 406 is electrically connected to the outer electrode 306A. In the first embodiment, the connection part 406b is not attached to the outer electrode 306A by bonding or the like.

The fourth lead 408 has a frame part 408a and a connection part 408b. The frame part 408a is located between the frame part 402a of the first lead 402 and the second lead 404 and extends along the optical axis direction of the lens (the axial direction of the barrel 202, i.e., Z direction). In the frame part 408a, a portion (hatched in FIG. 5) overlapping the surface 208c of the main wall part 208 is bonded to the main wall part 208 with an adhesive or the like. The connection part 408b is located between the lead part 402c of the first lead 402 and the lead part 404b of the second lead 404 and extends along the frame parts 402a, 404a. The leading end of the connection part 408b is in contact with the outer electrode 306B. Therefore, the fourth lead 408 is electrically connected to the outer electrode 306B. In the first embodiment, the connection part 408b is not attached to the outer electrode 306B by bonding or the like.

In thus constructed first embodiment, the pressing piece 108 presses the piezoelectric actuator 300 against the barrel 202 so as to keep such a state that at least one of the pair of frictional parts 304A, 304B is in contact with the outer peripheral surface of the barrel 202. Here, while the barrel 202 as a whole is pressed toward the columns 104, the shafts 106A, 106B engage the through-holes 218A, 218B, whereby tensions occur in the joints 210, 212 (arm members 210A, 210B, 212A, 212B). Driving the piezoelectric actuator 300 in this state translates the barrel 202 in the optical axis direction of the lens (the axial direction of the barrel 202, i.e., Z direction) so as to move it closer to and away from the base 100, while the barrel 202 receives the pressing force from the pressing piece 108 through the piezoelectric actuator 300. That is, the barrel 202 is elastically held between the base 100 (shafts 106A, 106B) and the pressing piece 108 independently of the driving state of the piezoelectric actuator 300. Hence, even upon application of an impact force from the outside of the lens drive device 1, a buffer action for absorbing the impact is exhibited. As a result, the highly reliable lens drive device 1 resistant to impact forces from the outside can be obtained.

In the first embodiment, the pressing piece 108 keeps such a state that at least one of the pair of frictional parts 304A, 304B is in contact with the outer peripheral surface of the barrel 202. Therefore, even when the barrel 202 is translated along the optical axis direction of the lens (the axial direction of the barrel 202, i.e., Z direction) so as to move closer to and away from the base 100, the optical axis hardly tilts during the translation. Hence, the lens holder 200 can be driven accurately.

In the first embodiment, the pressing piece 108 exhibits a cantilever form located on the opposite side of the piezoelectric actuator 300 from the barrel 202 and integrally disposed upright on the base 100, whereby the leading end part 108b of the pressing piece 108 can warp so as to provide the piezoelectric actuator 300 with a force directed to the lens holder 200 (barrel 202).

In the first embodiment, the lens drive device 1 is constituted by five components, i.e., the base 100, lens holder 200, piezoelectric actuator 300, conductive plate 400, and cover. Hence, the number of components is small, and their assembly is very easy.

Second Embodiment

The structure of a lens drive device 2 in accordance with the second embodiment will now be explained with reference to FIGS. 13 to 23. The lens drive device 2 in accordance with the second embodiment differs from the lens drive device 1 in accordance with the first embodiment mainly in structures of the base 100 and lens holder 200. In the following, differences from the lens drive device 1 in accordance with the first embodiment will mainly be explained, while omitting their overlapping descriptions.

Figure 18:
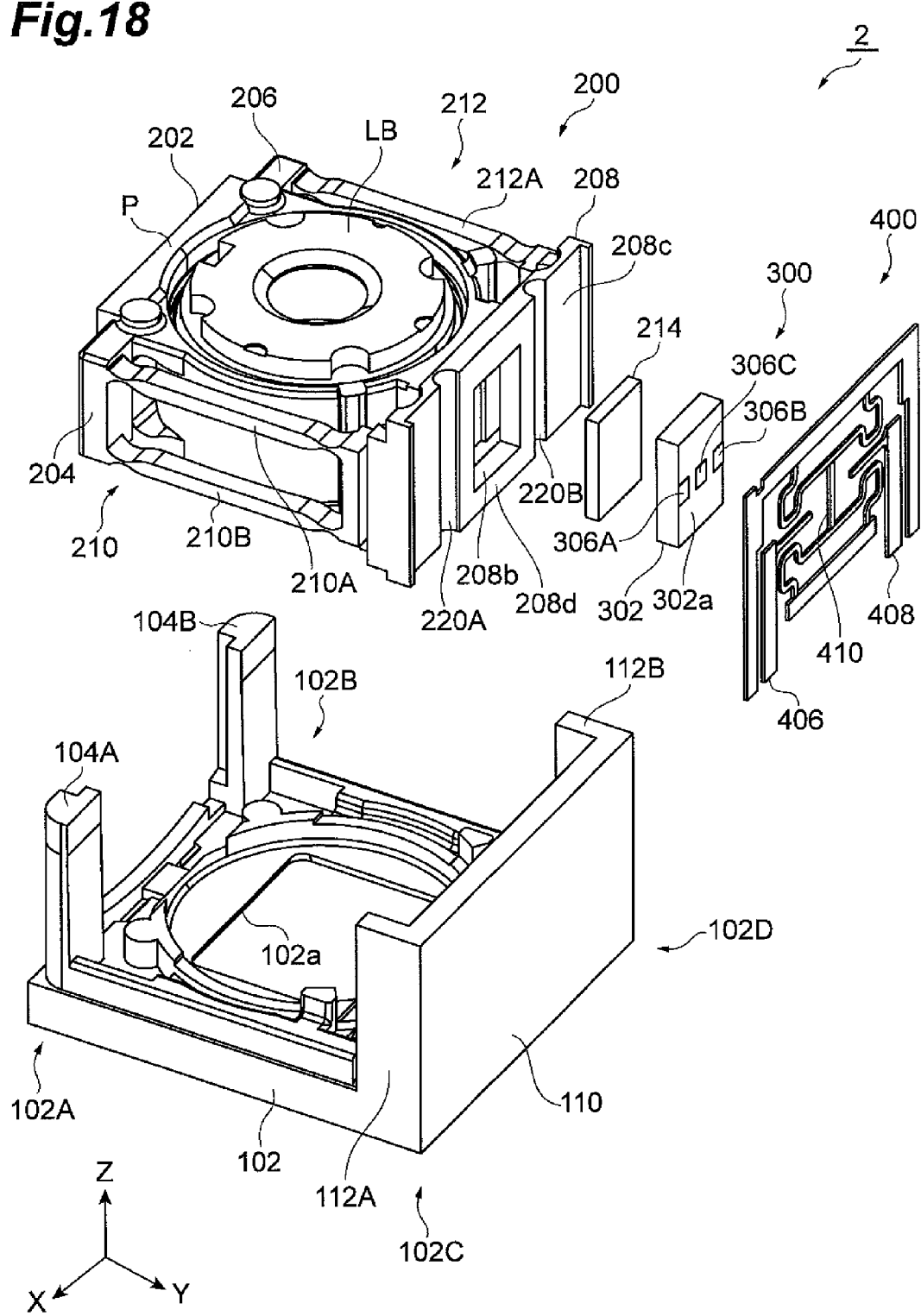
FIG. 18 is an exploded perspective view illustrating the lens drive device in accordance with the second embodiment as seen from the back face side.
Figure 19:
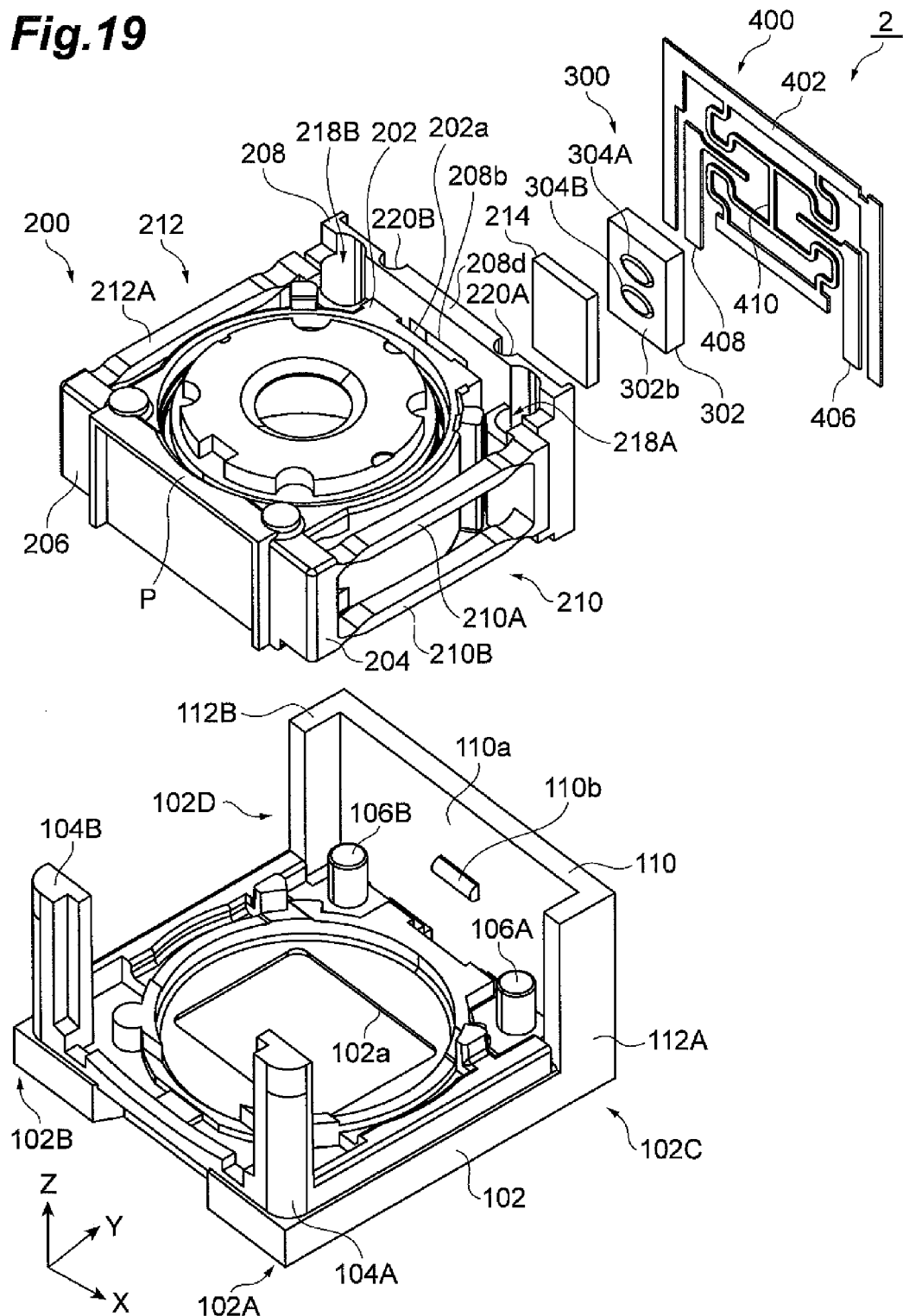
FIG. 19 is an exploded perspective view illustrating the lens drive device in accordance with the second embodiment as seen from its front face side.
Figure 20:
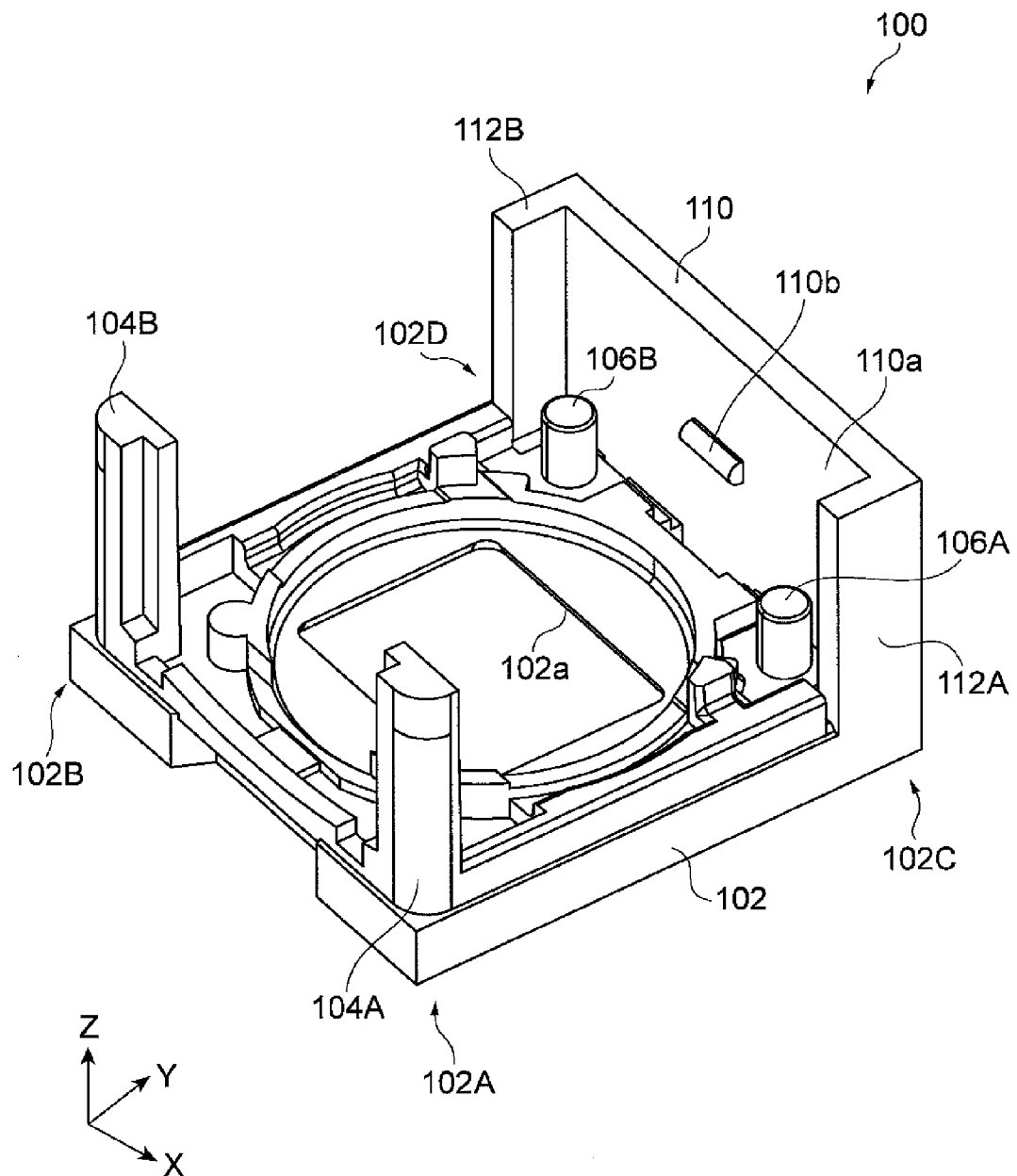
FIG. 20 is a perspective view illustrating the lens holder of the lens drive device in accordance with the second embodiment as seen from the back face side.
Figure 21:
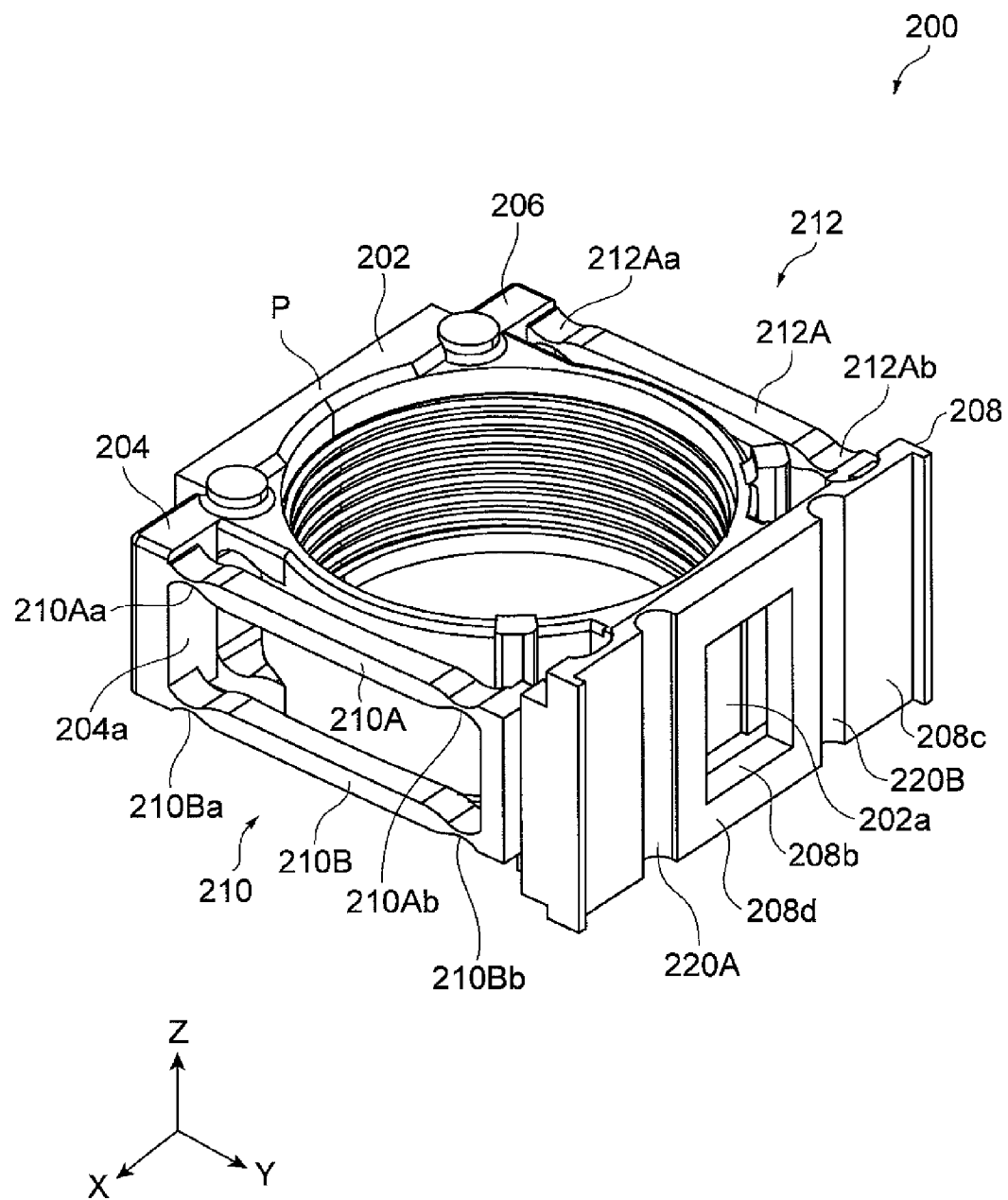
FIG. 21 is a perspective view illustrating the lens holder of the lens drive device in accordance with the second embodiment as seen from the front face side.
Figure 22:
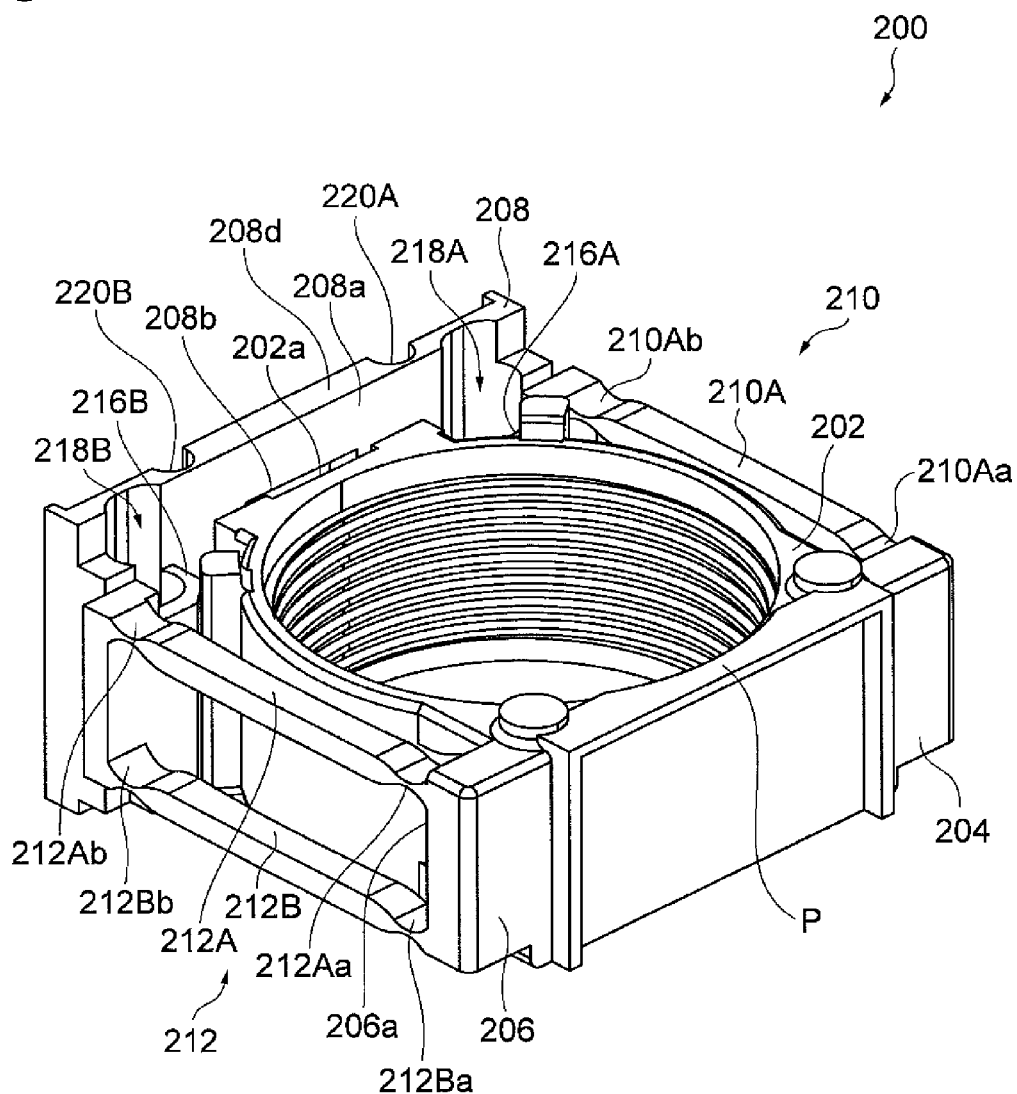
FIG. 22 is a top plan view illustrating the lens holder of the lens drive device in accordance with the second embodiment.

As illustrated in FIGS. 18 to 20, the base 100 has a bottom part 102, a pair of columns 104A, 104B, a pair of shafts 106A, 106B, and wall members 110, 112A, 112B. The wall members 110, 112A, 112B, each of which is a board-like body exhibiting a rectangular form, are disposed upright on the bottom part 102 in the thickness direction thereof (Z-axis direction). The wall member 110 extends between corners 102C, 102D of the bottom part 102. In the vicinity of the corner 102C of the bottom part 102, the wall member 112A extends from an end part of the wall member 110 on the corner 102C side toward the corner 102A. In the vicinity of the corner 102D of the bottom part 102, the wall member 112B extends from an end part of the wall member 110 on the corner 102D side toward the corner 102B. That is, the wall members 110, 112A, 112B form substantially a C shape when seen in the thickness direction of the bottom part 102 (Z-axis direction). A pair of columns 104, a pair of shafts 106, and the wall members 110, 112A, 112B extend from a main face of the bottom part 102 to the same side.

As illustrated in FIGS. 19 and 20, a protrusion 110b is disposed at a center part of a surface 110a of the wall member 110 opposing the pair of columns 104. The protrusion 110b exhibits a semicircular columnar form and extends along the direction (X direction) connecting the corners 102C, 102D to each other. The protrusion 110b is used for pressing the piezoelectric actuator 300 against the barrel 202. Therefore, in a state where the lens drive device 2 is assembled, the protrusion 110b opposes the through-hole 208b of the lens holder 200 and has a width configured smaller than that of the through-hole 208b. The protrusion 110b may have other forms such as semispherical and pyramid forms as long as it can press the piezoelectric actuator 300. The surface 110a may be provided with a plurality of protrusions 110b.

As illustrated in FIGS. 13, 14, 18, 19, and 21 to 23, the surface 208c of the main wall part 208 in the lens holder 200 is provided with a pair of grooves 220A, 220B. The pair of grooves 220A, 220B, each having a semicircular cross section, extend along the optical axis direction of the lens (the axial direction of the barrel 202, i.e., Z direction). The groove 220A is located between the through-hole 208b and the auxiliary wall part 216A. The groove 220B is located between the through-hole 208b and the auxiliary wall part 216B. Therefore, vicinities of the grooves 220A, 220B can warp, so as to allow a portion (hereinafter referred to as "center portion 208d") defined by the grooves 220A, 220B in the main wall part 208 to move slightly in the thickness direction of the main wall part 208 (Y direction).

The conductive plate 400 is structurally the same as that in the lens drive device 1 in accordance with the first embodiment but differs therefrom in its bonded portion. Specifically, in the frame part 402b of the first lead 402, a portion (hatched in FIG. 17) overlapping the center portion 208d is bonded to the center portion 208d with an adhesive or the like. In the lead part 402c of the first lead 402, portions (hatched in FIG. 17) overlapping the center portion 208d and piezoelectric actuator 300 are bonded to the center portion 208d and piezoelectric actuator 300 with an adhesive or the like.

In the frame part 404b of the second lead 404, a portion (hatched in FIG. 17) overlapping the center portion 208d is bonded to the center portion 208d with an adhesive or the like. In the lead part 404c of the second lead 404, portions (hatched in FIG. 17) overlapping the center portion 208d and piezoelectric actuator 300 are bonded to the center portion 208d and piezoelectric actuator 300 with an adhesive or the like. The joint 410 as a whole (hatched in FIG. 17) is bonded to the piezoelectric actuator 300 with an adhesive or the like.

In the connection part 406b of the third lead 406, portions (hatched in FIG. 17) overlapping the center portion 208d and piezoelectric actuator 300 are bonded to the center portion 208d and piezoelectric actuator 300 with an adhesive or the like. In the connection part 408b of the fourth lead 408, portions (hatched in FIG. 17) overlapping the center portion 208d and piezoelectric actuator 300 are bonded to the center portion 208d and piezoelectric actuator 300 with an adhesive or the like.

Thus, the piezoelectric actuator 300 held within the through-hole 208b is connected to the center portion 208d (main wall part 208) through the conductive plate 400. Therefore, the piezoelectric actuator 300 moves in response to movement of the center portion 208d.

In thus constructed second embodiment, an interaction between the protrusion 110b of the base 100 and the lens holder 200 presses the piezoelectric actuator 300 against the barrel 202 so as to keep such a state that at least one of the pair of frictional parts 304A, 304B is in contact with the outer peripheral surface of the barrel 202. Specifically, in a state where the lens drive device 2 is assembled, the wall member 110 and protrusion 110b hardly deform, while the protrusion 110b presses the piezoelectric actuator 300 against the barrel 202. Here, while the barrel 202 as a whole is pressed toward the columns 104, the shafts 106A, 106B engage the through-holes 218A, 218B, whereby tensions occur (see arrow B in FIG. 23) in the joints 210, 212 (arm members 210A, 210B, 212A, 212B). Then, a tension also occurs in the main wall part 208, so as to pull the main wall part 208 outward (see arrow C in FIG. 23). When the main wall part 208 is pulled outward, the center portion 208d incurs an inward force (directed to the barrel 202) to stay there (see arrow D in FIG. 23), since the center portion 208d is slightly movable in the thickness direction of the main wall part 208 (Y direction). Since the piezoelectric actuator 300 is connected to the center portion 208d through the conductive plate 400, a force further acts on the piezoelectric actuator 300 to press it against the barrel 202. Driving the piezoelectric actuator 300 in this state translates the barrel 202 along the optical axis direction of the lens (the axial direction of the barrel 202, i.e., Z direction) so as to move it closer to and away from the base 100, while the barrel 202 receives the pressing force from the pressing piece 108 through the piezoelectric actuator 300. That is, the barrel 202 is elastically held between the base 100 (shafts 106A, 106B) and the protrusion 110b independently of the driving state of the piezoelectric actuator 300. Hence, even upon application of an impact force from the outside of the lens drive device 2, a buffer action for absorbing the impact is exhibited. As a result, the highly reliable lens drive device 2 resistant to impact forces from the outside can be obtained.

In the second embodiment, an interaction between the protrusion 110b of the base 100 and the lens holder 200 keeps such a state that at least one of the pair of frictional parts 304A, 304B is in contact with the outer peripheral surface of the barrel 202. Therefore, even when the barrel 202 is translated along the optical axis direction of the lens (the axial direction of the barrel 202, i.e., Z direction) so as to move closer to and away from the base 100, the optical axis hardly tilts during the translation. Hence, the lens holder 200 can be driven accurately.

In the second embodiment, the lens drive device 2 is constituted by five components, i.e., the base 100, lens holder 200, piezoelectric actuator 300, conductive plate 400, and cover. Hence, the number of components is small, and their assembly is very easy.

Other Embodiments

The present invention is not limited to the embodiments thereof explained in detail in the foregoing. For example, the piezoelectric actuator 300 has two frictional parts 304A, 304B in the above-mentioned embodiments but may have three or more frictional parts.

In the above-mentioned embodiments, the joint 210 has a pair of arm members 210A, 210B, while the joint 212 has a pair of arm members 212A, 212B. However, as long as the arm members of the joints 210, 212, projections 204, 206, and main wall part 208 form a parallelogram when seen in the direction in which the joints 210, 212 oppose each other, the joints 210, 212 may each have at least one arm, the joint 210 alone may have two or more arm members, or the joint 212 alone may have two or more arm members.

The main wall part 208 and the base 100 are separated from each other in the above-mentioned embodiments, but may be constructed integrally with each other.

Though the above-mentioned embodiments connect two joints 210, 212 to one main wall part 208, the main wall part may be separated into a plurality of main wall parts so that the joints 210, 212 are connected to different main wall parts. In this case, each main wall part may be separated from or constructed integrally with the base 100.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A lens drive device comprising:
   a base;
   a lens holder arranged on the base;
   a piezoelectric actuator imparting a drive force to the lens holder; and
   a pressing piece that provides the piezoelectric actuator with a force to press the piezoelectric actuator against the lens holder;
   wherein the lens holder has:
      a barrel holding a lens;
      a projection projecting from an outer peripheral surface of the barrel in a direction intersecting an optical axis direction of the lens;
      a support supporting the barrel on the base, the support being located on the opposite side of the barrel from the projection while being separated from the barrel and disposed upright on the base; and
      a joint joining the projection and the support to each other;
   wherein one end side of the joint is bendable with respect to the projection so as to allow the barrel to move in the optical axis direction through the projection;
   wherein the other end side of the joint is bendable with respect to the support so as to allow the joint to move in the optical axis direction;
   wherein the piezoelectric actuator is arranged at a position opposing a region on the opposite side of the outer peripheral surface of the barrel from the projection and has a plurality of frictional parts separated from each other in the optical axis direction;
   wherein the pressing piece is located on the opposite side of the piezoelectric actuator from the barrel and is integrally disposed upright on the base; and
   wherein a leading end part of the pressing piece is a free end that presses the piezoelectric actuator against the barrel from the side of the support toward the side of the projection so as to keep a state that at least one of the plurality of frictional parts is in contact with the region.

2. The lens drive device according to claim 1, wherein the joint has a plurality of arm members, arranged in parallel with each other in the optical axis direction, extending between the projection and the support.

3. The lens drive device according to claim 1, wherein the pressing piece exhibits an L shape having the leading end part projecting toward the piezoelectric actuator.

4. A lens drive device comprising:
   a base;
   a lens holder arranged on the base;
   a piezoelectric actuator imparting a drive force to the lens holder; and
   a pressing piece that provides the piezoelectric actuator with a force to press the piezoelectric actuator against the lens holder;
   wherein the lens holder has:
      a barrel holding a lens;
      first and second projections each projecting from an outer peripheral surface of the barrel in directions (i) opposite from each other and (ii) intersecting an optical axis direction of the lens;
      a support supporting the barrel on the base, the support being located on the opposite side of the barrel from the first and second projections while being separated from the barrel and disposed upright on the base;
      a first joint joining the first projection and the support to each other; and
      a second joint joining the second projection and the support to each other;
   wherein the first and second joints extend in the same direction from the first and second projections, respectively, while interposing the barrel therebetween;
   wherein one end side of the first joint is bendable with respect to the first projection so as to allow the barrel to move in the optical axis direction through the first projection;
   wherein one end side of the second joint is bendable with respect to the second projection so as to allow the barrel to move in the optical axis direction through the second projection;
   wherein the other end sides of the first and second joints are bendable with respect to the support so as to allow the first and second joints to move in the optical axis direction;
   wherein the piezoelectric actuator is arranged at a position opposing a region on the opposite side of the outer peripheral surface of the barrel from the first and second projections and has a plurality of frictional parts separated from each other in the optical axis direction;
   wherein the pressing piece is located on the opposite side of the piezoelectric actuator from the barrel and is integrally disposed upright on the base; and
   wherein a leading end part of the pressing piece is a free end that presses the piezoelectric actuator against the barrel from the side of the support toward the side of the first and second projections so as to keep a state that at least one of the plurality of frictional parts is in contact with the region.

5. The lens drive device according to claim 4, wherein the first joint has a plurality of first arm members, arranged in parallel with each other in the optical axis direction, extending between the first projection and the support; and
   wherein the second joint has a plurality of second arm members, arranged in parallel with each other in the optical axis direction, extending between the second projection and the support.

6. The lens drive device according to claim 4, wherein the pressing piece exhibits an L shape having the leading end part projecting toward the piezoelectric actuator.

7. A lens drive device comprising:
   a base;
   a lens holder arranged on the base;
   a piezoelectric actuator imparting a drive force to the lens holder; and
   a protrusion that provides the piezoelectric actuator with a force to press the piezoelectric actuator against the lens holder;

wherein the lens holder has:
- a barrel holding a lens;
- a projection projecting from an outer peripheral surface of the barrel in a direction intersecting an optical axis direction of the lens;
- a support supporting the barrel on the base, the support being located on the opposite side of the barrel from the projection while being separated from the barrel and disposed upright on the base; and
- a joint joining the projection and the support to each other;

wherein one end side of the joint is bendable with respect to the projection so as to allow the barrel to move in the optical axis direction through the projection;

wherein the other end side of the joint is bendable with respect to the support so as to allow the joint to move in the optical axis direction;

wherein the piezoelectric actuator is arranged at a position opposing a region on the opposite side of the outer peripheral surface of the barrel from the projection and has a plurality of frictional parts separated from each other in the optical axis direction;

wherein the base has a wall member integrally disposed upright thereon and located on the opposite side of the piezoelectric actuator from the barrel; and wherein the protrusion is provided on the wall member so as to project toward the piezoelectric actuator and press the piezoelectric actuator against the barrel from the side of the support toward the side of the projection so as to keep a state that at least one of the plurality of frictional parts is in contact with the region.

8. The lens drive device according to claim 7, wherein the joint has a plurality of arm members, arranged in parallel with each other in the optical axis direction, extending between the projection and the support.

* * * * *